Aug. 12, 1958 D. E. TAYLOR ET AL 2,847,223

SOUND RECORDING AND REPRODUCING APPARATUS

Filed Sept. 16, 1952 12 Sheets-Sheet 1

INVENTORS
DOUGLAS E. TAYLOR
RALPH H. SHERMAN, Jr.
ARTHUR W. SKOOG
JOSEPH A. RESCSANSKI
BY
Curtis, Morris & Safford
ATTORNEYS

SOUND RECORDING AND REPRODUCING APPARATUS

Filed Sept. 16, 1952 12 Sheets-Sheet 2

INVENTORS
DOUGLAS E. TAYLOR
RALPH H. SHERMAN, Jr.
ARTHUR W. SKOOG
BY JOSEPH A. RESCSANSKI
Curtis, Morris & Safford
ATTORNEYS Aug. 12, 1958 D. E. TAYLOR ET AL 2,847,223

SOUND RECORDING AND REPRODUCING APPARATUS

Filed Sept. 16, 1952 12 Sheets-Sheet 3

INVENTORS
DOUGLAS E. TAYLOR
RALPH H. SHERMAN, Jr.
ARTHUR W. SKOOG
BY JOSEPH A. RESCSANSKI
Curtis, Morris & Safford
ATTORNEYS INVENTORS
DOUGLAS E. TAYLOR
RALPH H. SHERMAN, Jr.
ARTHUR W. SKOOG
JOSEPH A. RESCSANSKI
BY Curtis, Morris + Safford
ATTORNEYS

SOUND RECORDING AND REPRODUCING APPARATUS

Filed Sept. 16, 1952 12 Sheets-Sheet 5

INVENTORS
DOUGLAS E. TAYLOR
RALPH H. SHERMAN, Jr.
ARTHUR W. SKOOG
BY JOSEPH A. RESCSANSKI
Curtis, Morris + Safford
ATTORNEYS INVENTORS
DOUGLAS E. TAYLOR
RALPH H. SHERMAN, Jr.
ARTHUR W. SKOOG
BY JOSEPH E. RESCSANSKI
Curtis, Morris + Safford
ATTORNEYS

SOUND RECORDING AND REPRODUCING APPARATUS

Filed Sept. 16, 1952 12 Sheets-Sheet 7

INVENTORS
DOUGLAS E. TAYLOR
RALPH H. SHERMAN, Jr.
ARTHUR W. SKOOG
JOSEPH A. RESCSANSKI
BY Curtis, Morris & Safford
ATTORNEYS Aug. 12, 1958 D. E. TAYLOR ET AL 2,847,223

SOUND RECORDING AND REPRODUCING APPARATUS

Filed Sept. 16, 1952 12 Sheets-Sheet 8

INVENTORS
DOUGLAS E. TAYLOR
RALPH H. SHERMAN, Jr.
ARTHUR W. SKOOG
BY JOSEPH A. RESCSANSKI
Curtis, Morris & Safford
ATTORNEYS INVENTORS
DOUGLAS E. TAYLOR
RALPH H. SHERMAN, Jr.
ARTHUR W. SKOOG
BY JOSEPH A. RESCSANSKI
Curtis, Morris + Safford
ATTORNEYS

SOUND RECORDING AND REPRODUCING APPARATUS

Filed Sept. 16, 1952 12 Sheets-Sheet 10

INVENTORS
DOUGLAS E. TAYLOR
RALPH H. SHERMAN, Jr.
ARTHUR W. SKOOG
BY JOSEPH A. RESCSANSKI
Curtis, Morris & Safford
ATTORNEYS

SOUND RECORDING AND REPRODUCING APPARATUS

Filed Sept. 16, 1952

INVENTORS
DOUGLAS E. TAYLOR
RALPH H. SHERMAN, Jr.
ARTHUR W. SKOOG
JOSEPH A. RESCSANSKI
BY Curtis, Morris + Safford
ATTORNEYS

SOUND RECORDING AND REPRODUCING APPARATUS

Filed Sept. 16, 1952

INVENTORS
DOUGLAS E. TAYLOR
RALPH H. SHERMAN, Jr.
ARTHUR W. SKOOG
JOSEPH A. RESCSANSKI
BY Curtis, Morris & Safford
ATTORNEYS United States Patent Office 2,847,223

Patented Aug. 12, 1958

2,847,223

SOUND RECORDING AND REPRODUCING APPARATUS

Douglas E. Taylor, Westport, Ralph H. Sherman, Jr., Fairfield, Arthur W. Skoog, Bridgeport, and Joseph A. Rescsanski, Trumbull, Conn., assignors to Dictaphone Corporation, Bridgeport, Conn.

Application September 16, 1952, Serial No. 309,802

40 Claims. (Cl. 274—4)

This invention relates to sound recording and reproducing apparatus of the type using a flexible sheet-like record material on which the sound signals are recorded. More particularly, this invention relates to improved apparatus for handling records of this type.

Such sheet records may be formed of thin sheets of flexible plastic or they may comprise paper or other material that is coated or impregnated with suitable material. For example, sound signals may be recorded magnetically on a paper or plastic sheet having a magnetizable coating on one face.

Although there are many advantages in the use of such records, particularly in dictating machines for business use, they are not now in common use. This is in part because earlier apparatus for inserting records into and removing them from the machine required considerable manipulative skill on the part of the operator, and with some of the proposed arrangements the loading and unloading operations were tedious and time-consuming.

In order for a dictating machine to be entirely practicable in business use, it must be constructed so that records can be placed on or removed from the machine rapidly and easily and the procedure must not require the operator to perform a number of sequential operations that are difficult to learn or troublesome to keep in mind.

The present invention provides for an improved record-handling apparatus by which the operation of the machine is simplified and the possibility of improper operation because of a mistake by the operator is materially reduced.

This improved record handling apparatus is described as embodied in a dictating machine for business use that provides automatic loading and unloading of the records and includes interlocking circuits and components that not only control the sequence of operations, but prevent damage to the machine or records which might otherwise result from incorrect operation of the machine.

In many respects, the present invention may be regarded as an improvement over the machine described by Frederick W. Roberts in U. S. application Serial No. 767,210, filed August 7, 1947.

These and other aspects, objects, and advantages of the invention will be in part obvious from and in part pointed out in the following description, describing one of the various possible embodiments, considered in connection with the accompanying drawings, in which.

Figures 20, 21, 22, 23:
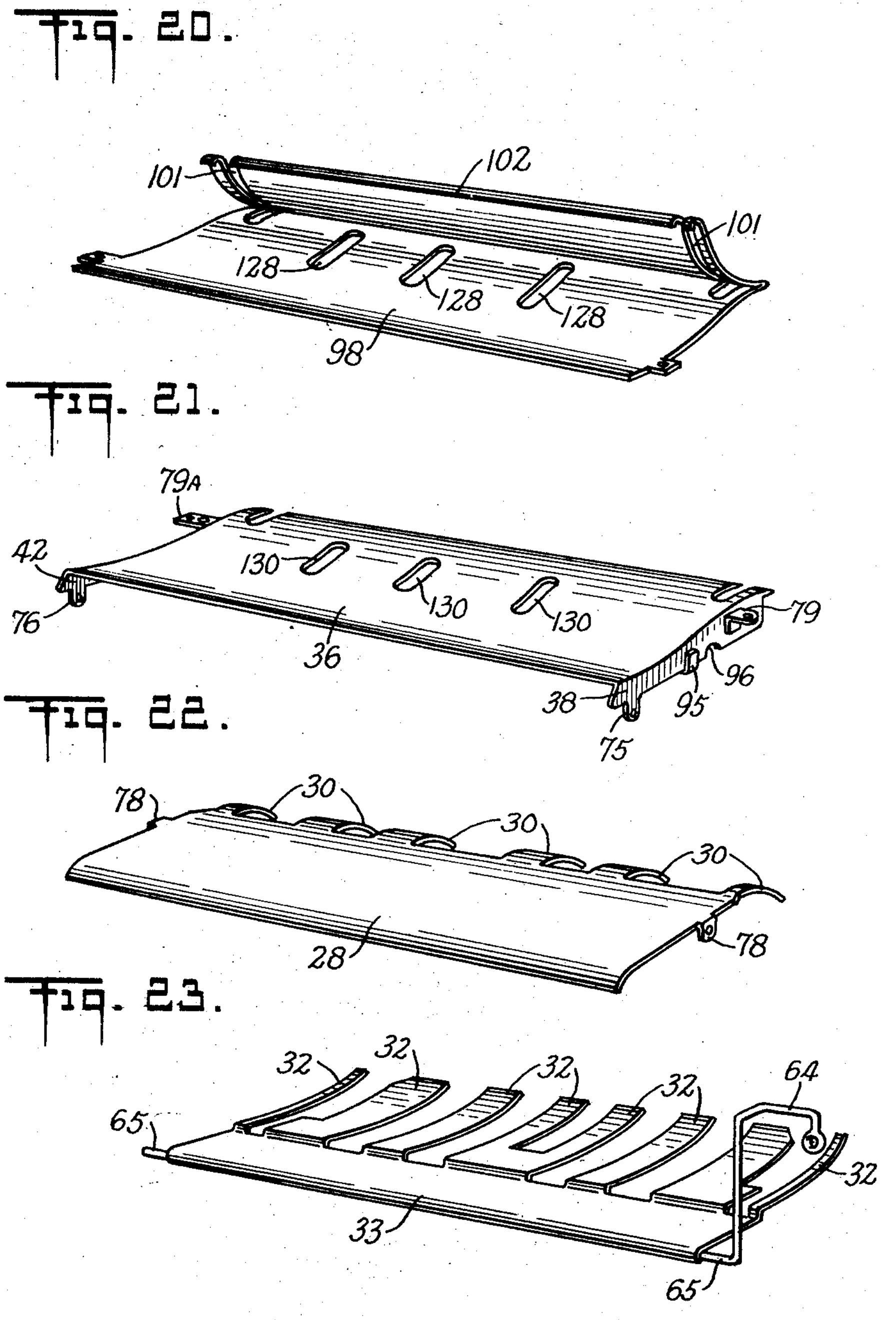
Figure 20 is a perspective view of an upper fixed guide plate of the chute assembly that forms the upper surface of the record ejection channel.
Figure 21 is a perspective view of a movable intermediate guide plate of the chute assembly that serves as the upper surface of the record channel when the record is being inserted into the machine, and as the lower surface of the record channel when the record is being ejected.
Figure 22 is a perspective view of a lower guide plate of the chute assembly; this guide plate forms the lower surface of the record channel when the record is being inserted.
Figure 24:
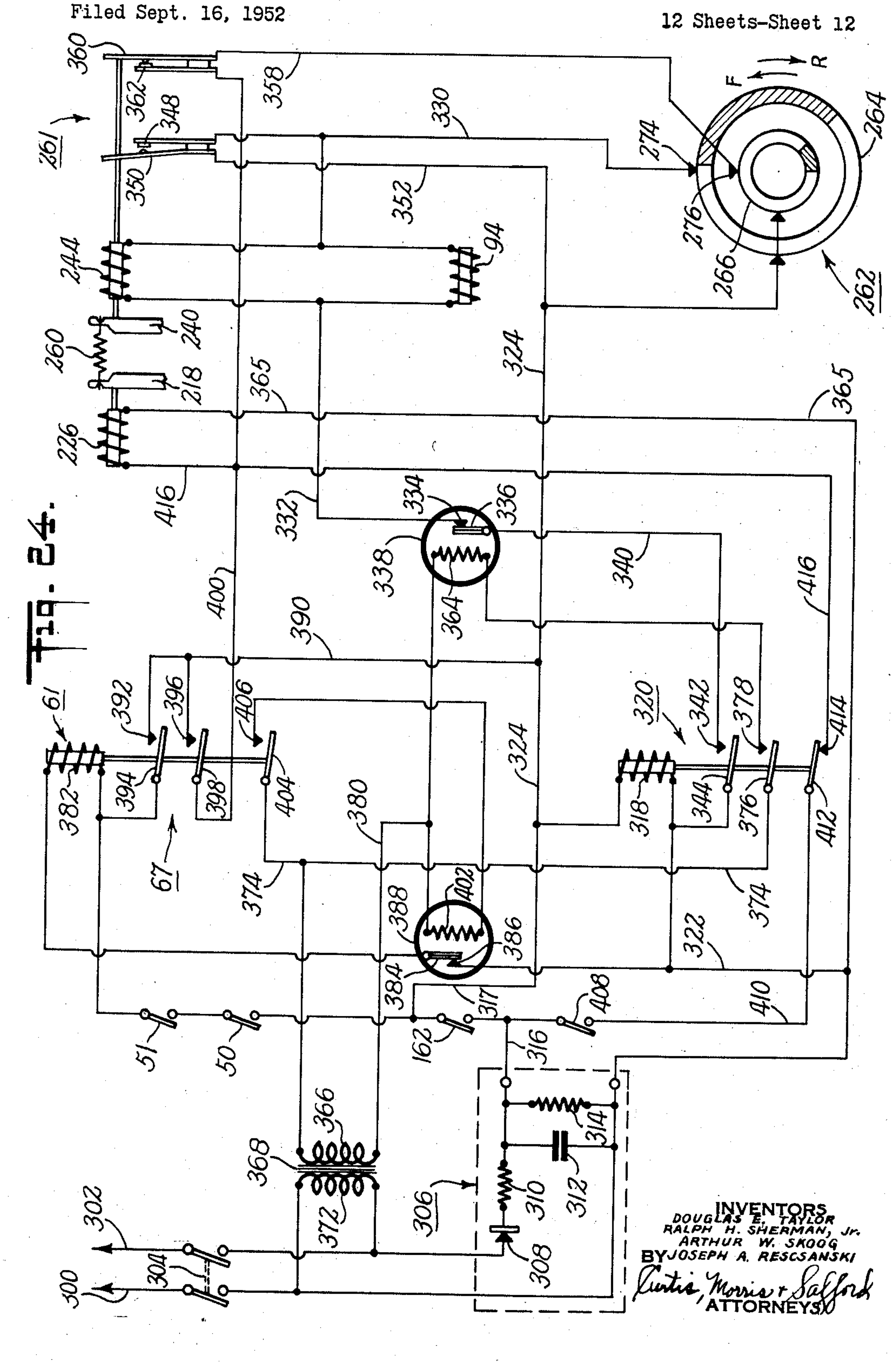

Figure 23 is a perspective view of a cradle having curved fingers that lift the leading edge of the record into position on the record-supporting mandrel when the record is inserted, and which serve also to direct the trailing end of the record into the record-ejection chute when the record is being removed from the machine; and Figure 24 is a schematic diagram of electrical circuits for operating the dictating machine shown in the preceding drawings.

GENERAL DESCRIPTION

*(Figures 1 and 4)*

Figure 1:
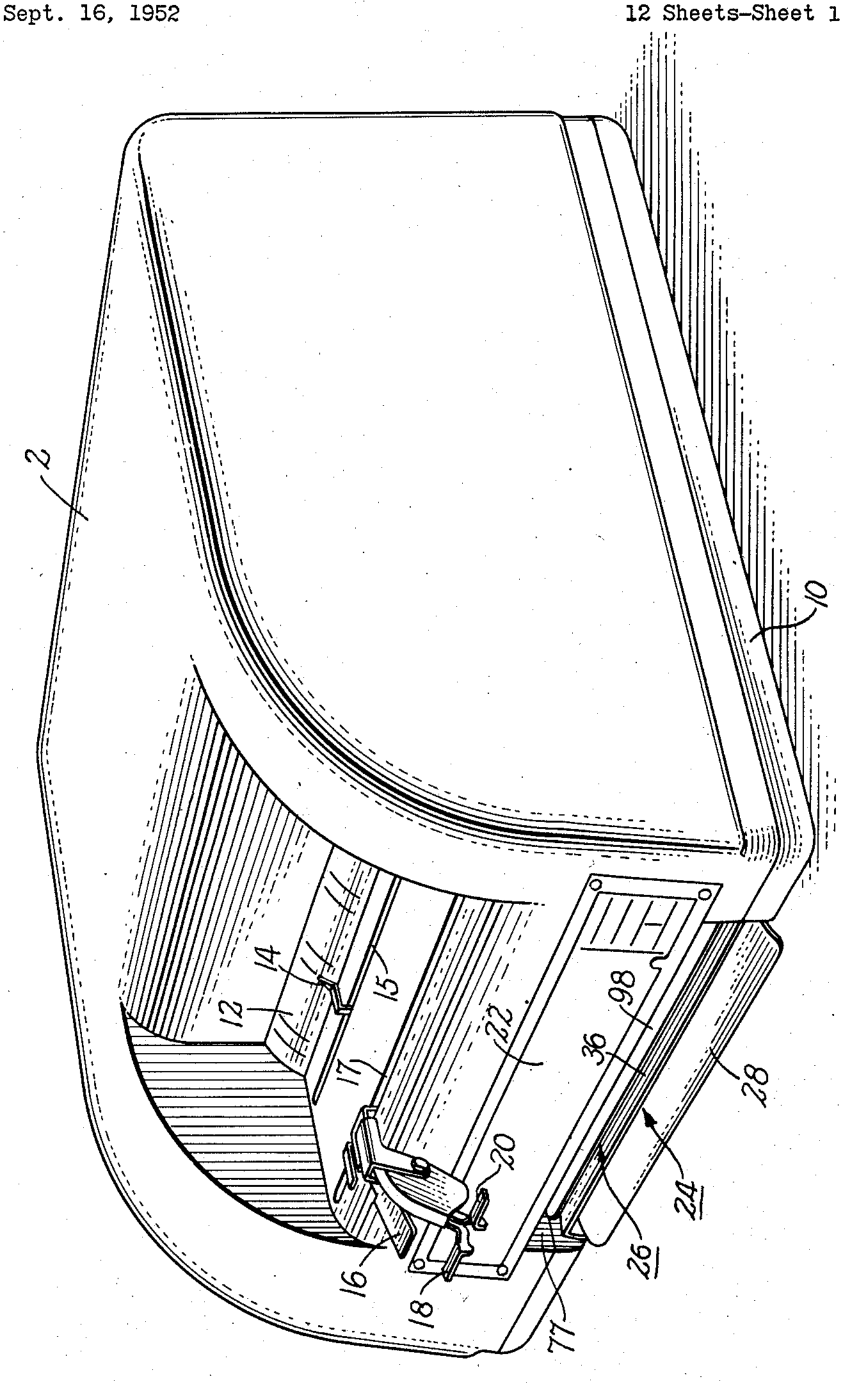
Figure 1 is a perspective view of a dictating machine embodying the present invention and adapted to record sound signals on sheets of paper or plastic coated with magnetic material.

As shown in Figure 1, the entire machine, except for the manually-operated controls, the microphone and the speaker, is housed within a metal cover 2 and is adapted to utilize a record in the form of a flexible sheet, for example of paper or plastic, having a thin coating of magnetizable material such as is ordinarily used for magnetic recording. This record sheet may be, for example, 8½ inches wide and 11 inches long, so that it can be stored conveniently in ordinary letter files or other office equipment designed for the usual business letter paper.

Figure 4:
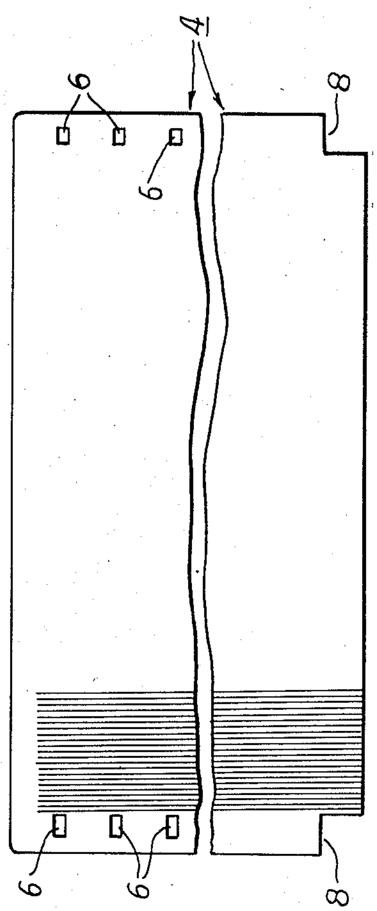
Figure 4 is a plan view of a record sheet suitable for use in the dictating machine shown in Figures 1 to 3, the center portion of the sheet being omitted to conserve space in the drawings.

Figure 4 shows such a sheet record, generally indicated at 4, suitable for use in the machine shown in Figure 1. The end of the record that first enters the machine is provided with a plurality of abutment means therein by which the record is engaged and driven, shown as being provided by two groups of three rectangular sprocket holes 6 along opposite sides of the record sheet for positioning and handling the record. The sprocket holes along the left hand edge of the record sheet are somewhat longer than those near the right hand edge of the record to permit the record to lie smoothly on the surface of a record-supporting mandrel in the dictating machine irrespective of slight dimensional changes in the record caused, for example, by changes in the humidity of the atmosphere.

At the trailing end of the record two cut-out portions, as indicated at 8, are provided to permit the trailing edge of the record to overlap the leading edge when the record is wrapped around the mandrel in the machine. A record of this type is described in detail in a copending application of F. W. Roberts et al., Serial No. 96,764, filed June 2, 1949, now abandoned.

The operating parts of the machine are mounted on a base 10 (Figure 1), for example, of cast aluminum or other suitable material, to which the cover 2 is secured. A transparent plastic window 12 is provided in the front of the machine, so that the record 4 can be seen by the operator, and a movable pointer 14, extending through a slot 15 in the cover 2, is provided to indicate the position of the recording head relative to the record.

A carriage assembly, which will be described later, carries a pivotally-mounted, three-position, control lever 16 movable along a slot 17 in the cover 2. This control lever has a central neutral position, a lower position (as shown in Figure 1) that conditions the machine for recording, and an upper position that conditions the machine for reproducing.

The usual marking mechanism, operated by levers 18 and 20, is provided for indicating errors, the ends of letters, and the like, on indicating slips 22 positioned in a suitable recess in the front of the cover 2.

Because the particular constructions and characteristics of these and other controls, such as switches, volume controls, and the like, ordinarily provided on dictating machine for business use, form no part of the present invention, they have been omitted from the drawings and description in order to simplify them, but it is understood that such controls are incorporated in the illustrated dictating machine.

The dictating machine is provided with a suitable translating device (not shown) which may take the form of a separate microphone and loudspeaker, or a combination hand-held microphone-loudspeaker unit may be provided. A switch, controlled by a push-button associated with the microphone, may be provided for starting and stopping the movement of the record sheet when recording or reproducing, or a separate switch, for example controlled by a foot-treadle, may be provided if desired, the particular details of this switch, microphone, and speaker, forming no part of the present invention.

OPERATION

*(Figure 1)*

In operation, electric power is supplied to the machine in the usual manner through a suitable manually-controlled switch, shown only in the circuit diagram of Figure 24.

In order to condition the machine for loading, the carriage assembly is moved, by means of the lever 16 which projects through the slot 17, to its furthermost position near the left-hand side of the machine, this position being called herein the "control position." The record 4, positioned with the magnetically-coated side facing downwardly and with the sprocket holes 6 near the leading edge, is inserted into a record-insertion chute, generally indicated at 24 in Figure 1, access to which is permitted by a suitable opening in the front of the cover 2.

This chute or channel 24 directs the record toward a mandrel around which the record is wrapped during recording or reproducing; this mandrel will be described in detail later. When the record 4 has been pushed into the correct position with respect to the record-supporting mandrel, an automatic mechanism, triggered by the sheet record 4, engages the record with the mandrel and starts the rotation of the mandrel pulling the record on into the machine and wrapping it around the mandrel in recording position.

After a few revolutions of the mandrel, a time-delay circuit stops the mandrel and places its subsequent operation under the control of the operator. The machine is then used in the usual manner, that is, the operator dictates into a suitable microphone and, as dictation proceeds, he may stop and start rotation of the mandrel at will by means of a suitable hand or foot switch, shown only schematically in Figure 24.

If it is desired to reproduce or "listen back" to matter already recorded, the control lever 16 is moved to its neutral position and used to slide the carriage to the position corresponding to the portion of the recorded material that is to be reproduced and then placed in its reproducing position.

When it is desired to remove a completed or partially-completed record sheet from the machine, the carrige is again placed in the left-hand "control position," and the record 4 is automatically ejected from the machine. Moving the carriage to the "control position" automatically positions the chute assembly and the mandrel correctly for ejection of the record and then starts the record-supporting mandrel rotating in reverse direction, so that the record is ejected through a record-ejection chute, generally indicated at 26.

When the record has been ejected, an automatic mechanism stops the rotation of the mandrel in the correct position for engaging the next record when it is inserted into the machine; this position of the mandrel is referred to herein as the "index position."

In general, the operation of this machine, aside from the record-handling mechanism, is similar to that described in the above-identified copending application Serial No. 767,210.

THE RECORD HANDLING MECHANISM

*(Figures 6 and 8 to 23)*

Figures 18, 19:
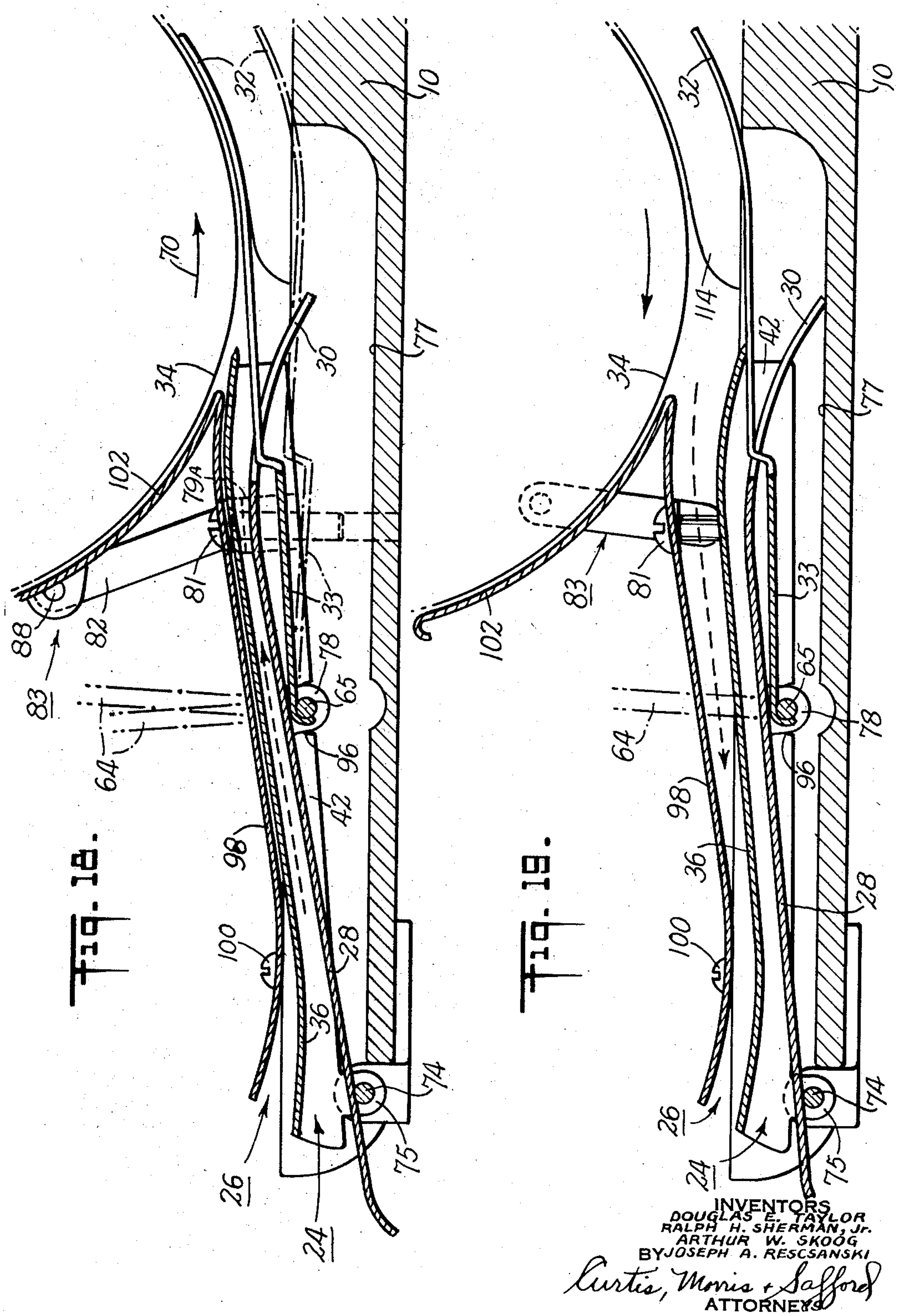
Figure 18 is an enlarged vertical sectional view showing the chute assembly in position for inserting the record sheet.
Figure 19 is a view similar to Figure 18 but showing the chute assembly conditioned for ejection of the record from the machine.

Figures 18 and 19 show the more important parts of the chute assembly positioned, respectively, for loading and unloading the machine. The lower surface of the portion of the loading chute 24, through which the record 4 enters the machine, is formed near the front of the machine, as shown in Figure 18, by a lower guide plate 28 (see also Figure 22), which is provided along its edge nearest the rear of the machine, with curved, spaced, downwardly-extending leaf fingers 30.

These fingers 30 pass through openings between another set of curved leaf fingers 32, which curve somewhat upwardly and form part of a record-positioning cradle 33 (see also Figure 23). These fingers 32 form the lower surface of the record-insertion chute 24 near a record-supporting mandrel or drum 34.

The upper surface of the record-insertion chute 24 is formed by an intermediate movable guide plate 36 (see also Figure 21), one edge of which may be positioned adjacent the surface of the record-supporting mandrel 34. The sides of the record-insertion chute 24 are formed by downwardly-extending flanges 38 and 42 along opposite sides of the intermediate guide plate 36.

Thus, when the sheet record 4 is inserted by hand into the chute 24, it is directed horizontally by the side walls 38 and 42 and slides between the upper surface of the lower guide plate 28 and the lower surface of the intermediate guide plate 36.

In order for the mandrel to engage the record, two sets of sprockets 44 (Figure 15) are carried on its surface, one set near each end of the mandrel. These sprockets are placed on the mandrel in such positions that when the mandrel is in its "index position," the sprockets will engage the sprockets holes 6 in the record 4.

As the record is pushed into the machine over the upper surface of the cradle-fingers 32, its leading edge strikes a switch-actuating lever 46, in this example a small stiff wire pivoted at 48 and connected to operate a switch 50 mounted within the mandrel 34, as by screws 54. The lever 46 extends outwardly through a slot 56 (Figure 16) in the surface of the mandrel 34. The opposite end of the mandrel 34 carries another switch 51 (see also Figure 14) arranged in the same manner as the switch 50 and carrying an actuating lever 52.

These switches 50 and 51 are provided to control the record-loading mechanism that positions the record on the mandrel and causes the mandrel to rotate and wrap the record around the mandrel in recording position.

A tooth or abutment 58 on the mandrel 34, which serves as a stop for the lever 46, is aligned with but spaced from the sprockets 44 and is provided with a groove 59 along one face, aligned with the slot 56 in the surface of the mandrel 34 for receiving the switch-actuating lever 46. A similar tooth or abutment 60 at the opposite end of the mandrel serves as a stop for the other switch lever 52.

Figure 14:
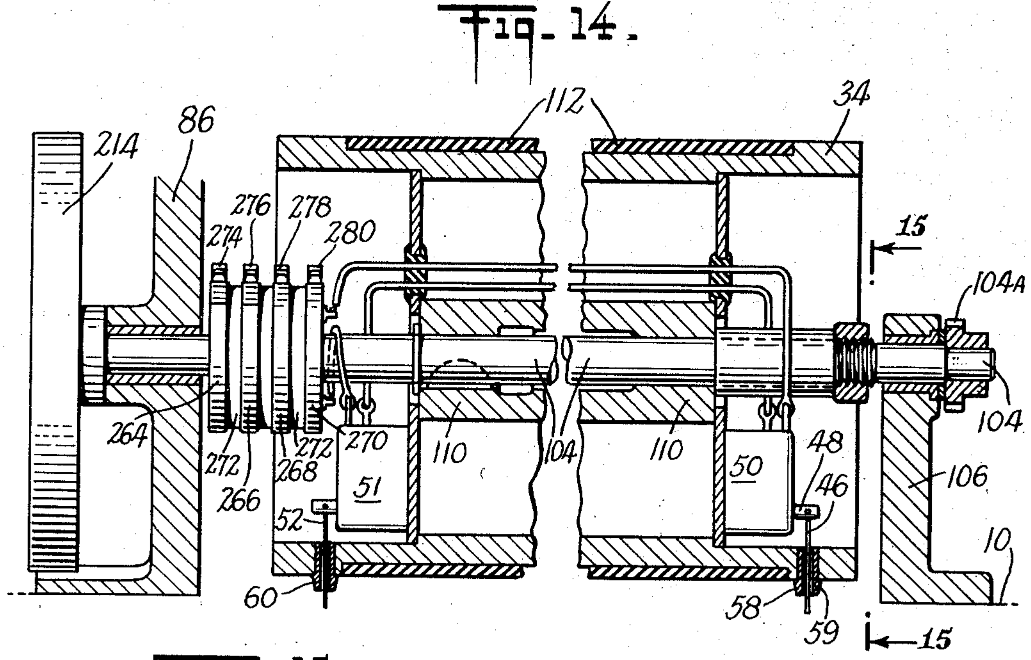
Figure 14 is an enlarged sectional view taken along line 14—14 of Figure 2, with the center portion cut away showing the record-supporting mandrel and the commutator arrangement for controlling and positioning the record-supporting mandrel.
Figure 15:
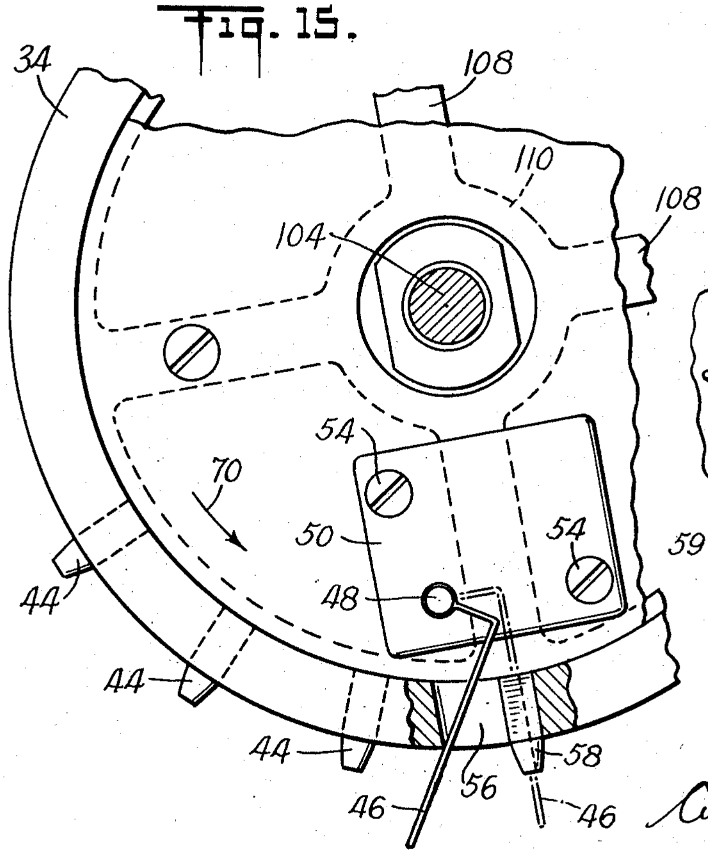
Figure 15 is an enlarged partial sectional view taken along line 15—15 of Figure 14 showing three record-positioning sprockets and a record-actuated switch mounted on the record-supporting mandrel.
Figure 16:
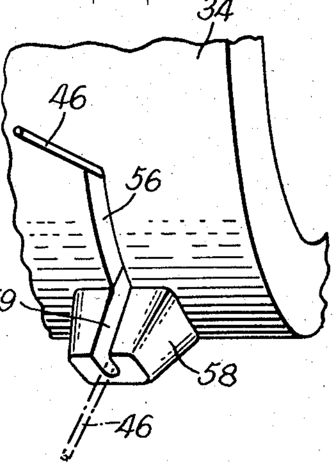
Figure 16 is an enlarged perspective view showing a portion of the record-supporting mandrel and the position of a record-operated lever that controls the switch for energizing a record-positioning mechanism and starting rotation of the mandrel.
Figure 17:
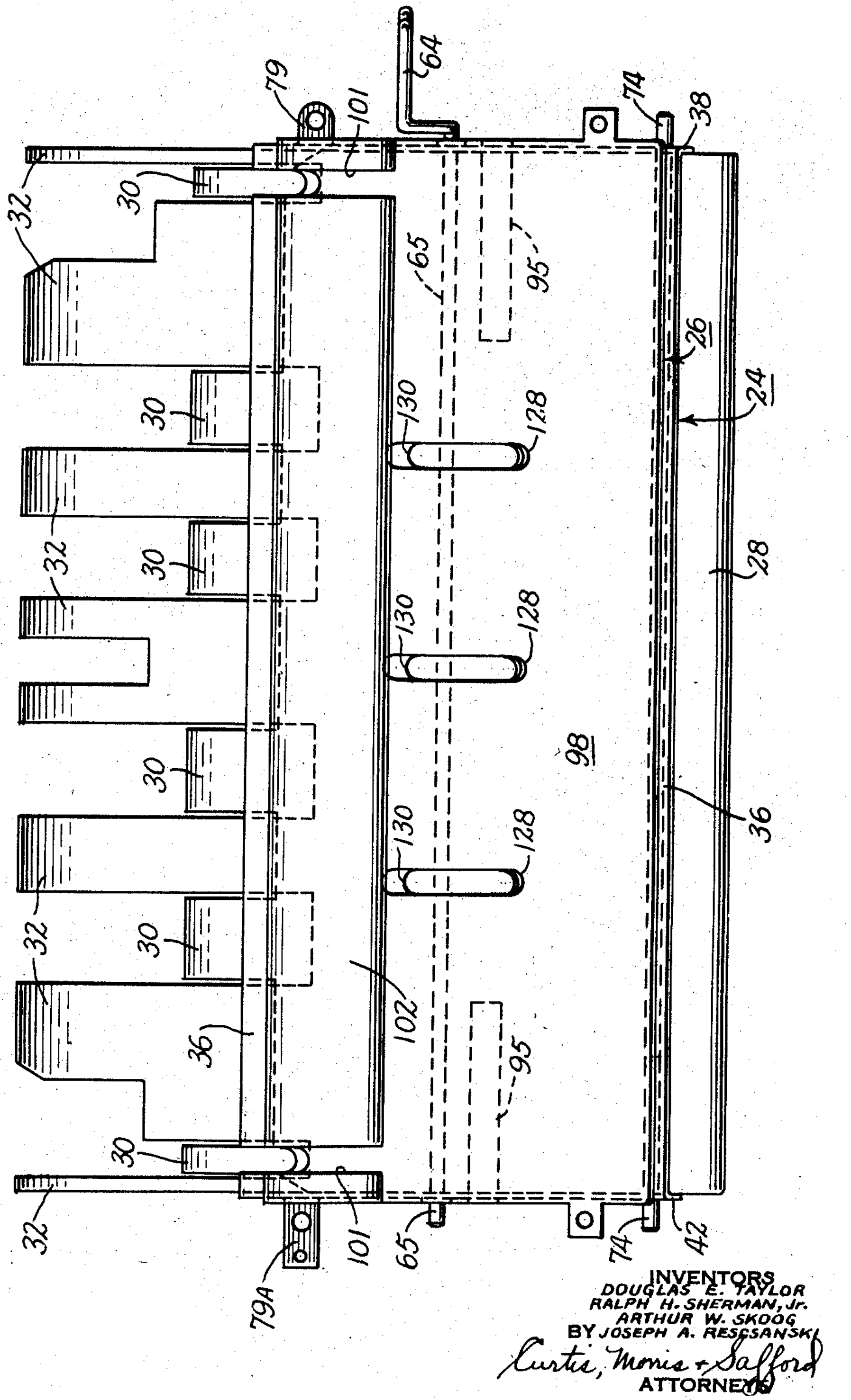
Figure 17 is an enlarged plan view of the record chute assembly for guiding the record sheet when loading and unloading the machine.

When the record is inserted into the loading chute 24, the components of the chute assembly are in the positions shown in Figure 18, except for the record-positioning cradle 33 which is in the position indicated in broken lines. The record, as it is inserted, therefore slides freely over the upper surface of the fingers 32 of this cradle and strikes the switch-actuating levers 46 and 52, which extend downwardly to these fingers 32, closing the switches 50 and 51 (Figure 14).

These switches 50 and 51 are connected in series, as will be explained later in connection with Figure 24, and are arranged to energize cradle-control driving means including a solenoid 61 (Figure 6) the armature 62 of which is connected by a rod 63 to a crank arm 64 (see also Figure 23) which is connected to a supporting rod 65 that extends along the edge of the cradle 33 nearest the front of the machine. A compression spring 66 surrounding the rod 63, abuts at one end an armature bearing 62A and at the other end thrusts against a washer and nut 66A, thus, biasing the cradle 33 in a clockwise direction as seen in Figure 18, that is, to the position shown in broken lines.

When the cradle control solenoid 61 is energized by the closing of the record-operated switches 50 and 51, the rod 63 is pushed forwardly of the machine, rotating the cradle-supporting rod 65 about its axis to move the cradle 33 to the position indicated in full lines in Figure 18, thus bringing the leading portion of the record 4 into contact with the surface of the mandrel 34 and preferably engaging at least two of the sprockets 44 on the mandrel 34 with the corresponding holes 6 in the record.

Because the record-actuating switches 50 and 51 are carried on the mandrel 34, alignment of the record holes 6 with the sprockets 44 is assured and considerable variation in the "index position" of the mandrel 34 is permissible without interfering with the loading operation. It is, of course, important that the distance between each of the actuating levers 46 and 52, at the instant it actuates its switch to the "on" position, and the adjacent sprocket 44 be equal to the distance between the leading edge of the record sheet and the first sprocket hole.

The cradle-control solenoid 61 (Figure 6) is arranged also to actuate a switch 67 by means of an arm 68 extending perpendicularly from the armature 62 and arranged to strike a push-button 69 on the switch 67. When the cradle 33 is lifted by the solenoid 61, the switch 67 initiates rotation of the mandrel 34 in its forward direction, as indicated by arrow 70 in Figures 15 and 18. Because the switch 67 is under the control of the solenoid 61, there is no possibility of the mandrel starting before the record is positioned properly. A control mechanism, to be described, stops the mandrel after a few revolutions and releases the cradle 33 allowing it to drop to its lower position, the machine then being conditioned for recording.

Figure 13:
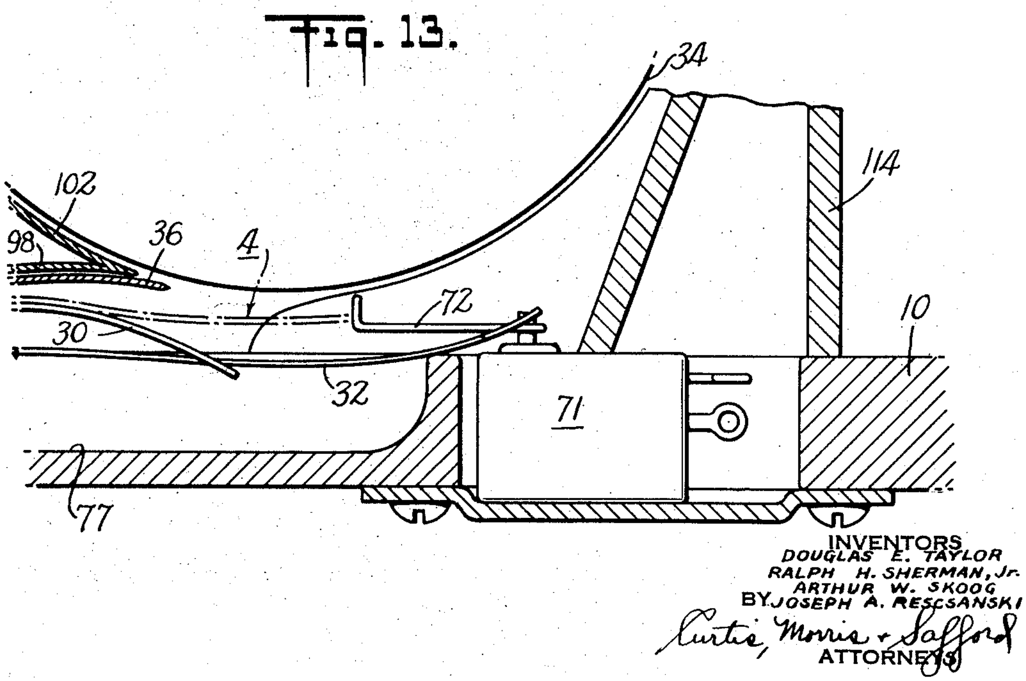
Figure 13 is an enlarged partial sectional view corresponding in position to Figure 12 but showing another embodiment of the record control mechanism.

As an alternative to locating switches 50 and 51 on the mandrel, one or two switches may be positioned on the base 10. Such a switch 71 is shown in Figure 13 provided with an actuating arm 72 extending, for example, at an angle of 45 degrees relative to the direction of movement of the record 4 when it is being loaded. With the switch 71 supported independently of the mandrel 34, it is necessary that the machine be arranged to position the mandrel 34 precisely with respect to the base 10 so that when the record is inserted the sprockets 44 will be in exact alignment with the sprocket holes 6 in the record, or to construct the loading mechanism so that the sprockets 44 will move into engagement with the record holes 6 after the record is positioned adjacent the mandrel by the upward movement of the cradle 33.

When the recording is completed and it is desired to remove the record, the direction of rotation of the mandrel 34 is reversed, by a clutch mechanism to be described later, and the record unwinds from the mandrel 34 and travels forwardly through the ejection chute 26, best shown in Figure 19.

In order to condition the chute assembly for the ejection of the record, the various parts are arranged as follows. The intermediate guide plate 36, which forms the upper surface of the loading chute 24 and the lower surface of the ejection chute 26, is pivotally mounted on a rod 74 near the chute entrance. This supporting rod 74 extends through holes in a pair of ears 75 and 76, best shown in Figure 21, extending downwardly from the sides of the plate 36, the rod 74 extending transversely across and being supported by the walls of a recess 77, provided in the base 10 to accommodate the chute assembly. (See also Figure 10.)

The lower guide plate 28 is provided with two downwardly-extending opposed ears 78 (Figures 19 and 22) which are pivotally supported on the rod 65 that extends along one edge of the record-positioning cradle 33. This lower guide plate 28 is positioned between the cradle 33 and the lower surface of the intermediate guide plate 36, the width of the lower guide plate 28, transversely of the dictating machine, being less than that of the intermediate guide plate 36 so that the lower guide plate can extend within the downwardly extending flanges 38 and 42 of the intermediate guide plate, the lower guide plate 28 resting on the supporting rod 74 near the front of the machine.

The intermediate guide plate 36 carries two ears 79 and 79A extending outwardly on opposite sides from the flanges 38 and 42, respectively. Two adjustable limit pins 80 and 81, best shown in Figure 10, supported by the base 10, extend vertically through holes in the ears 79 and 79A, respectively, so that the intermediate guide plate is permitted to pivot about the supporting rod 74 between fixed limits, it being this movement that changes the chute assembly between loading and unloading conditions. When the intermediate guide plate 36 is moved upwardly, the movement is limited by the heads of the limit pins 80 and 81 so that the end of the plate 36 just clears the surface of the mandrel 34 as shown in Figure 18.

In order to shift the chute assembly between loading and unloading conditions, the ear 79A (Figure 10) is pivotally connected to the lower link 82 of a toggle, generally indicated at 83 (see also Figure 8), the upper link 84 of which is pivotally secured at 85 to a wall-like standard 86 supported from or cast integrally with the base 10. At the center of the toggle, the links 82 and 84 are pivotally connected together and to one leg of an L-shaped connecting bracket 87 by a screw 88. The other leg of the bracket 86 is connected by a push-rod 90 to the movable armature 92 of a chute-actuating solenoid 94.

When this solenoid 94 is not energized, the chute assembly assumes the position shown in Figure 18 in which the machine is in condition for insertion of the record, the assembly being maintained in this position by a leaf spring 95 (see also Figure 11) one end of which is secured to a side wall 42 of the intermediate guide plate 36, the other end slidably engaging the floor of the recess 77 in the base 10.

When the record is to be ejected, the solenoid 94 is energized, pulling the armature 92 into the solenoid and expanding the toggle 83. The resulting downward movement of the lower end of the toggle 83 causes the intermediate guide plate 36 to pivot downwardly about its supporting rod 74 into the position shown in Figure 19. When the guide plate 36 starts its downward movement, notches, as indicated at 96 in Figure 21, in the lower edges of the flanges 38 and 42 of the plate 36, bear against the cradle-supporting rod 65, carrying this rod together with the lower guide plate 28 and the cradle 33 downwardly to the positions shown in Figure 19.

With the chute assembly thus positioned, the upper surface of the record ejection chute 26 is formed by a fixed guide plate 98 (Figure 19) which is rigidly secured to the base 10 of the machine, for example, by suitably placed screws such as the one indicated at 100. The end of the fixed guide plate 98 near the mandrel 34 is provided with an upwardly and backwardly-extending arcuate record-guiding portion 102 positioned adjacent, but spaced slightly from, the surface of the mandrel 34 to hold the sheet record in close contact with the mandrel over this area. Two slots 101 (Figure 20) in this record guiding portion 102 are provided to permit passage of the sprockets 44 and the switch-actuating arms 46 and 52.

To eject the record 4, the mandrel 34 is rotated in its reverse direction so that the overlapping trailing edge of the record leaves the surface of the mandrel 34 as it approaches the ejection chute and strikes the upper surface of the cradle fingers 32 and slides over the end of the intermediate guide plate 36 into the ejection chute 26. In some instances, the record may not come in contact with the cradle fingers 32 but may strike first the intermediate guide plate 36 or the underside of the upper fixed guide plate 98.

As explained above, the supporting rod 65, which supports the lower guide plate 28 and the cradle 33, is carried downwardly by the downward movement of the intermediate guide plate 36 when the machine is conditioned to eject the record 4. The leaf spring 95 (Figures 8 and 11) is provided because the guide plate 36 is not secured to this rod 65. The spring 95 is compressed by the undersurface of the lower guide plate 28 when this plate is moved downwardly and serves to return the lower guide plate 28, and accordingly the cradle 33, to the correct positions for loading a record when the compressive force on the spring 95 is released.

THE RECORD-SUPPORTING MANDREL

*(Figures 1, 2, 8, 12, 20, and 21)*

Figures 8, 9, 10, 11:
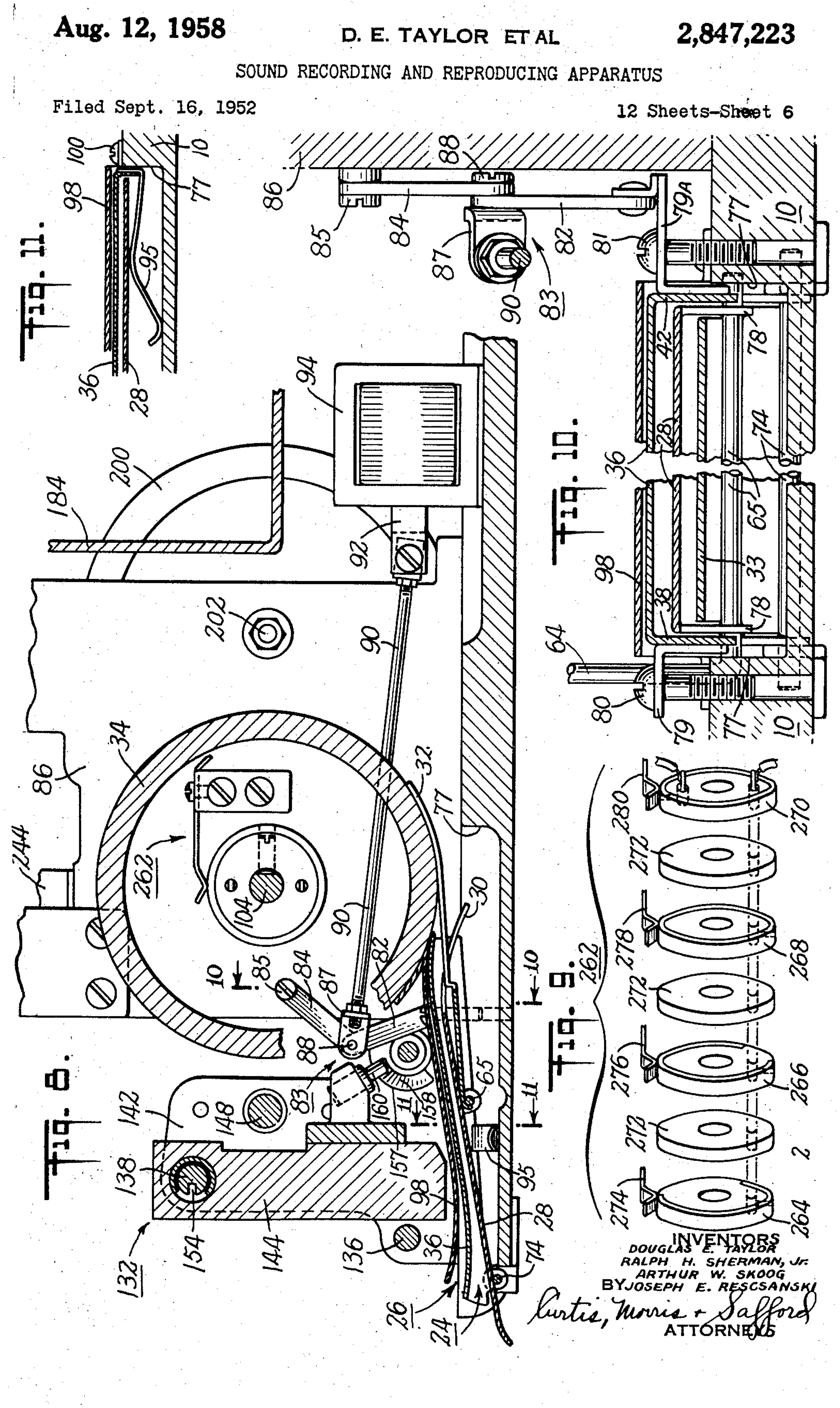
Figure 8 is an enlarged partial sectional view taken along line 8—8 of Figure 2 showing the actuating mechanism for conditioning the chute assembly to receive or eject a sheet record.
Figure 9 is a perspective view showing, diagrammatically, a commutator switch arrangement for controlling the record handling mechanism.
Figure 10 is an enlarged partial sectional view taken along line 10—10 of Figure 8 showing the vertical relationship of the guide plates that make up the record chute assembly by which the sheet records are inserted into and removed from the dictating machine.
Figure 11 is an enlarged partial sectional view taken along line 11—11 of Figure 8 showing a spring which normally biases the record chute assembly into the position for record insertion.

The mandrel 34 may be constructed of any suitable non-magnetic material and is generally similar to the mandrel described in the above-identified application Serial No. 767,210. The mandrel is supported by a drive shaft 104 (Figure 2) one end of which is rotatably supported in a standard 106 extending upwardly from and preferably cast integrally with the base 10. The opposite end of the drive shaft 104 extends through and is rotatably supported by the standard 86 (Figure 8).

The mandrel 34, for example, may be formed by a cylindrical casting of aluminum having spokes 108 (Figure 12) and hubs 110 at either end which are secured to the mandrel drive shaft 104. A thin coating or layer 112 of rubber or similar material preferably covers the outer sruface of the mandrel beneath the record 4 so that the recording head will ride smoothly over the record surface.

Because no fastening means are provided for the trailing edge of the record, which on the mandrel overlaps the leading edge of the record, circumferential guiding means are provided extending substantially all the way around the mandrel to maintain the record 4 in close proximity to the mandrel surface and to prevent the record from buckling or jamming, particularly when the mandrel 34 is reversed to eject the record.

Accordingly, three frame members or "bulkheads" 114 (Figures 2 and 12) are positioned, respectively, near opposite ends and at the center of the mandrel. These bulkheads are secured to the base 10 and are provided with semi-circular interior surfaces having a curvature corresponding to the outer surface of the mandrel 34. These surfaces are spaced from the surface of the mandrel sufficiently to allow ample room for the sheet record on the surface of the mandrel 34.

The transparent plastic window 12 (Figures 1 and 12) extends forwardly from the bulkheads 114 and is curved to follow closely the contour of the outer surface of the mandrel. This plastic window is supported from the forward ends of bulkheads 114 by thin strips of metal 118, for example of copper, secured by screws 119 to the ends of the bulkheads 114 and extending beneath the plastic window 12 adjacent, but spaced from, the surface of the mandrel. This transparent window 12 permits observation of the record 4 by the operator through a suitable opening in the cover 2, as shown in Figure 1. The circumferential record guiding means is completed by the record-guiding portion 102 of the upper fixed guide plate 98.

During recording, the space between the lower end of the plastic window 12 and upper end of the record-guiding portion 102 is open to permit a recording head 120 (Figure 12) to make contact with the record surface. In order to bridge this opening when a record is being positioned on or removed from the mandrel 34, a mechanism is provided, to be described later, which rotates three spaced bridging members 122 from the position shown in full lines in Figure 12 to the position indicated in broken lines, so that the arcuate faces 126 of these bridging members form a continuation of the record guiding surface between the lower end of the plastic window 12 and the upper end of the guide plate 102, before a record is ejected from the machine or a new record inserted. This is accomplished by the clockwise rotation (as seen in Figure 12) of a supporting rod 124 to which the retainer bars or bridging members 122 are secured.

Figure 12:
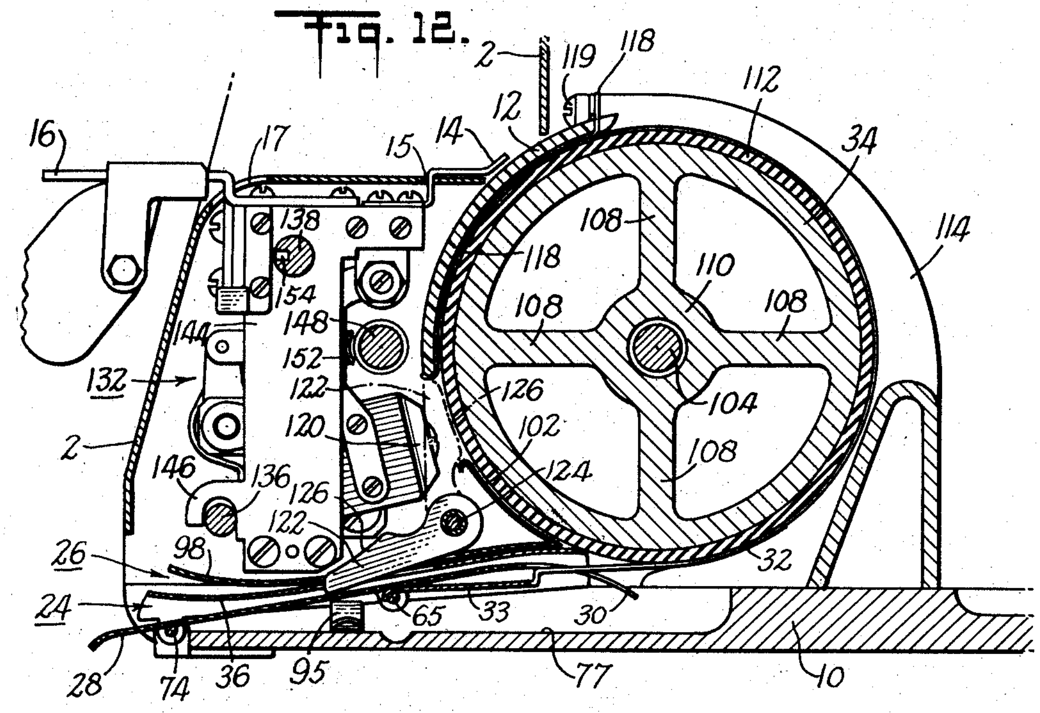
Figure 12 is an enlarged partial sectional view taken along line 12—12 of Figure 2 showing the carriage assembly and the record guiding means for maintaining the sheet record tightly wrapped around the record-supporting mandrel.

When the machine is being used for recording or reproducing, these bridging members are in the position shown in full lines in Figure 12. Elongated openings 128 in the upper guide plate 98 (see also Figures 20 and 21) and corresponding openings 130 in the intermediate guide plate 36 permit the ends of the retainer bars 122 to rest against the upper surface of the lower guide plate 28, thus blocking the record insertion chute 24 so that a second record cannot be inserted into the machine when a record is already on the mandrel or when the machine is conditioned for recording or reproducing operation. This feature will be described more completely in connection with the carriage-operated control mechanism that conditions the machine for loading and unloading.

CARRIAGE DRIVE AND CARRIAGE-OPERATED RECORD CONTROL MECHANISM (*Figures 2, 3, 6, 8, and 12*)

A movable carriage assembly, generally indicated at 132 (Figures 2 and 3) carries the recording head 120 (see also Figure 12) and is arranged to move along a path parallel to the axis of the mandrel 34 and adjacent the record surface as the mandrel 34 rotates, so that the sound track on the record 4 forms a helical path.

The carriage 132 is supported in conventional manner by means of a lower carriage-supporting rod 136 (Figure 12) and an upper carriage-supporting rod 138, these rods being supported by a standard 140 on the right-hand portion of the machine (Figures 2 and 3), and by a standard 142 near the left-hand side of the machine, these standards being suitably secured to or cast as an integral part of the base 10.

The upper guide rod 138 extends laterally through the carriage, suitable openings being provided in the frame 144 of the carriage 132 to act as bearing surfaces. A bracket 146 (Figure 12) extending forwardly from the carriage frame 144 is provided with a downwardly extending U-shaped opening which encompasses a portion of the lower guide rod 136 and supports the lower portion of the carriage against movement in the forward or backward direction. A lead screw 148 (Figures 3 and 12) extends transversely across the machine and is rotatably supported by the standards 140 and 142.

The position of the recording head 120 is controlled by the operating lever 16 (see Figures 1 and 12). This lever is arranged, by a suitable linkage mechanism, so that when it is in its lowermost position, the recording position, the face of the head 120 engages the surface of the record 4 and a feed nut 152 (Figure 12) engages the threads of the lead screw 148 to move the recording head 120 along the record surface. When this control lever 16 is moved to its neutral position, the head 120 assumes the position shown in Figure 12, and the feed nut 152 is disengaged from the lead screw 148 so that the carriage can be manually positioned with respect to the record 4. When the lever 116 is in its uppermost position, the reproducing position, the recording head 120 again makes contact with the record surface and the feed nut 152 again engages the lead screw 148. Movement of the lever 116 from its neutral position to the reproducing position automatically backspaces the recording head 120 by means of a suitable member (not shown) which frictionally engages the inner surface of a groove 154 that extends longitudinally the full length of the upper carriage guide rod 138.

Movement of the control lever 16 between its recording, neutral, and reproducing positions causes a corresponding rotation of the carriage-supporting rod 138, by means of a key (not shown) that slidably engages the groove 154 in the rod 138. The end of the rod 138, outside the standard 140, is secured to an arm 155 (Figure 6) that is pivotally connected to a rearwardly extending link member 156 which is arranged to operate a switching mechanism (not shown) for conditioning the amplifier and associated circuits for recording or reproducing in accordance with the position of the control lever 16. The amplifier and associated circuits, forming no part of the present invention, are not described herein.

Although the general operation of the carriage assembly has been described, the detailed construction of this assembly is not shown or described because it does not constitute a unique portion of this machine. A carriage assembly generally similar to that described in the above-identified application Serial No. 767,210, or other arrangements, may be utilized.

Movement of this carriage assembly 132 to its left-hand or "control position," for loading or unloading the machine, automatically rotates the bridging members 122 to the position shown in broken lines in Figure 12. These bridging members 122 are operated by a cam 157 (Figure 3), secured to the rod 124, that is provided with a helical groove 158. As the carriage is moved toward the left, a follower pin 160 (Figure 8) on the carriage assembly 132, engages the cam groove 158 and rotates the rod 124 in a clockwise direction as seen in Figure 8, so that the faces 126 of the bridging members 122 bridge the recording head opening adjacent the surface of the mandrel 34.

Figure 3:
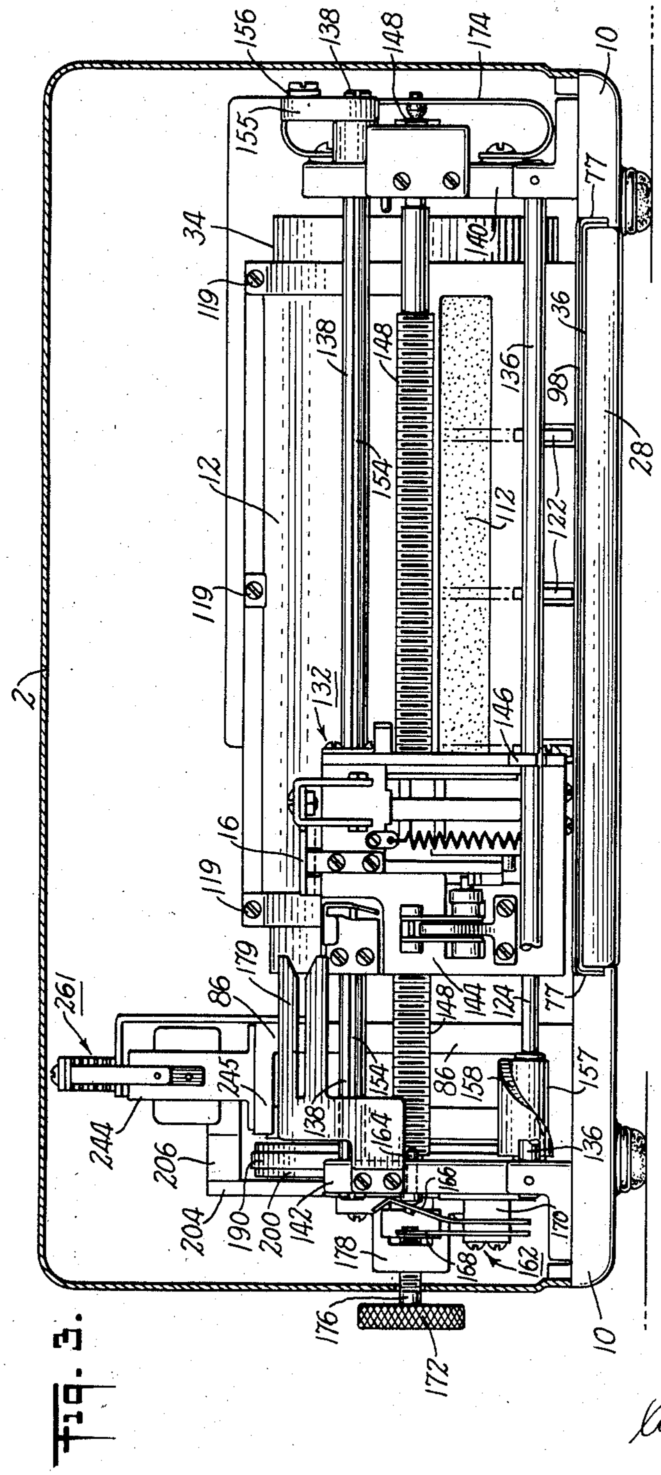
Figure 3 is a front elevational view of the dictating machine shown in Figure 2.

When the carriage is moved to this "control position," in which it is positioned completely beyond the mandrel 34, a carriage-operated switch, generally indicated at 162 in Figure 3, operates automatic circuits that condition the chute assembly as shown in Figure 19 for ejection of the record, if there is one on the mandrel, and causes the mandrel 34 to rotate in its reverse direction to eject the record. When the record is ejected, the chute assembly is returned automatically to the record-insertion position, shown in Figure 18, and the mandrel 34 is positioned in its "index position" to receive a new record.

In order to actuate the electrical circuits for controlling the chute assembly and the rotation of the mandrel for loading and unloading the machine, the side of the carriage structure 132 is arranged to strike a switch-actuating pin 164 slidably mounted in the standard 142. The opposite end of the pin 164 engages a spring contact member 166 and moves it into engagement with a second contact member 168 of the carriage-operated switch 162 to close an electrical circuit that will be described in connection with the electrical circuits shown in Figure 24. In the arrangement shown in Figure 3, the switch contact members 166 and 168 are supported by an insulating block 170 secured to the standard 142.

When a record, made at some earlier time, is to be reproduced on the machine or when a considerable period of time elapses between the recording and reproducing of a portion of a record sheet already on the machine, slight dimensional changes in the record, caused for example by changes in the humidity of the atmosphere, may prevent the recording head 120 from tracking precisely with the sound track recorded on the record. In order to insure proper tracking at all times, a phasing adjustment is provided which permits the carriage assembly 132 to be advanced or retarded with respect to the record 4 by manual adjustment. Thus, the head 120 can be positioned correctly with respect to the sound track by rotating a phasing control knob 172 as shown in Figure 3. This adjustment may be made without altering or disengaging the mandrel or carriage drive mechanism. Adjustment of this knob moves the lead screw 148 toward the left or right depending upon the direction in which the knob 172 is rotated. The feed screw 148, therefore, is slidably mounted in the standards 140 and 142. A C-shaped spring member 174 biases the feed screw 148 toward the left as seen in Figure 3. The knob 172 is secured to a shaft 176 that is in threaded engagement with a supporting block 178 carried by the standard 142, the end of the shaft 176 making an endwise bearing contact with the feed screw 148, so that by rotating the knob 172 the feed screw 178 may be moved toward the right against the force of the spring 174.

This phasing arrangement is generally similar to that described in the above-identified application Serial No. 767,210, and the details accordingly are not set forth herein.

It is of course necessary that the lever 16 be in its neutral position, so that the feed-nut 152 is disengaged from the feed screw 148, before the head can be placed in the "control position." It is important, however, that the lever 16 be locked in this position so that the head will not be driven by the feed-screw when a record is being inserted or ejected. In order to prevent the lever from being moved accidentally, it is locked precisely in the center of the neutral position whenever the carriage is in the "control position." A carriage-locking arm 179 (Figures 2 and 3) is supported from the standard 142 and has a longitudinal slot into which the lever 16 slides as the carriage is moved into its "control position," thus locking the lever 16 in neutral position. In order to be sure the lever 16 is in the center of its neutral range, and to prevent its abutting the end of the member 179 if it is not, the member 179 is provided with convergent cam surfaces at its end and these are arranged to guide the lever into the slot.

Figure 2:
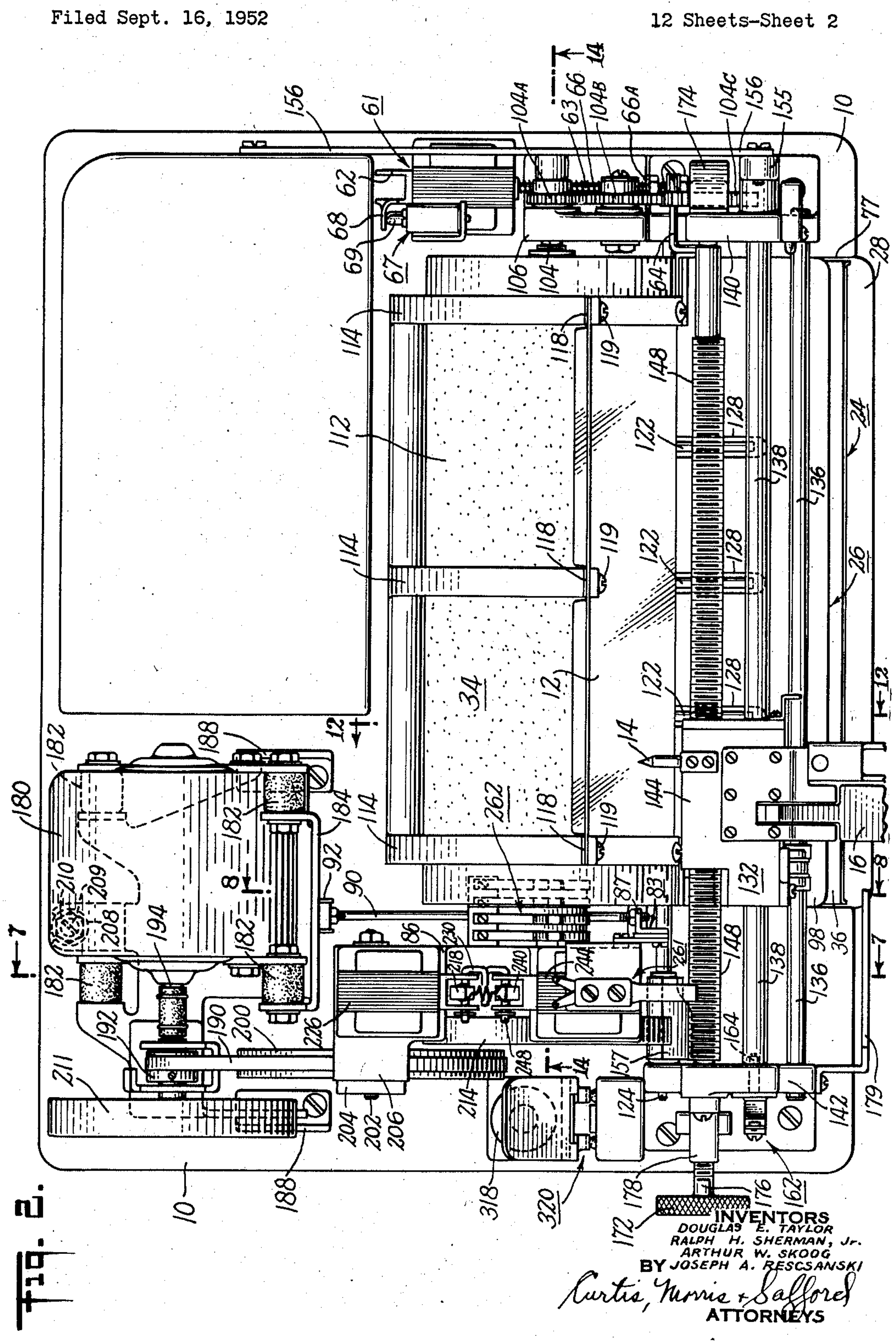
Figure 2 is a plan view of the dictating machine shown in Figure 1; the cover is removed to show the arrangement of the components.
Figure 5:
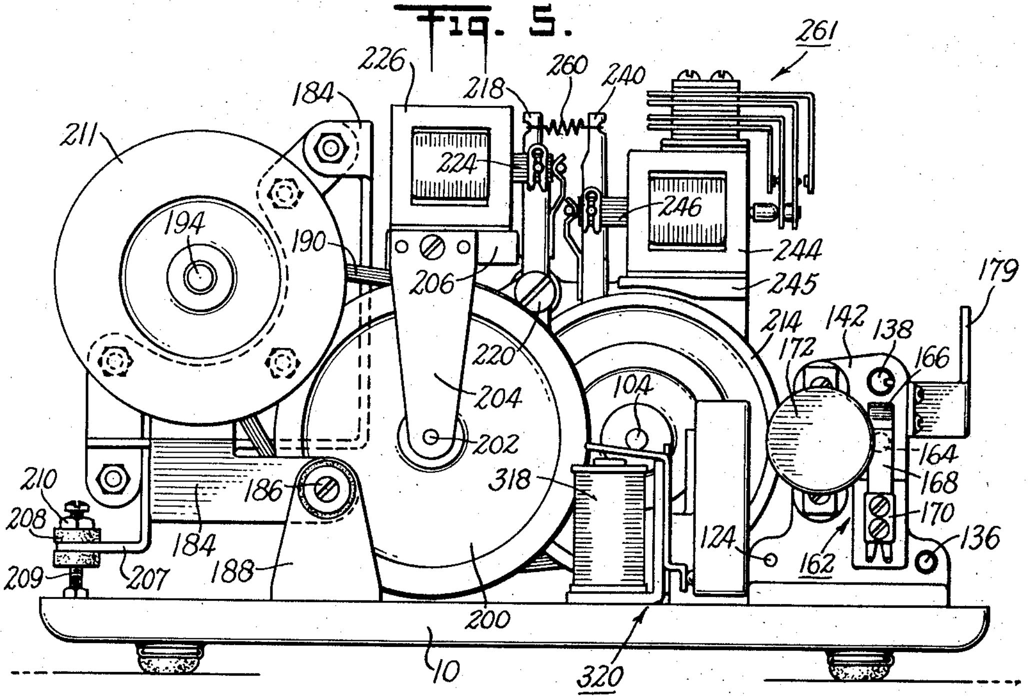
Figure 5 is a side elevational view of the dictating machine as seen from the left of Figures 2 and 3.
Figure 6:
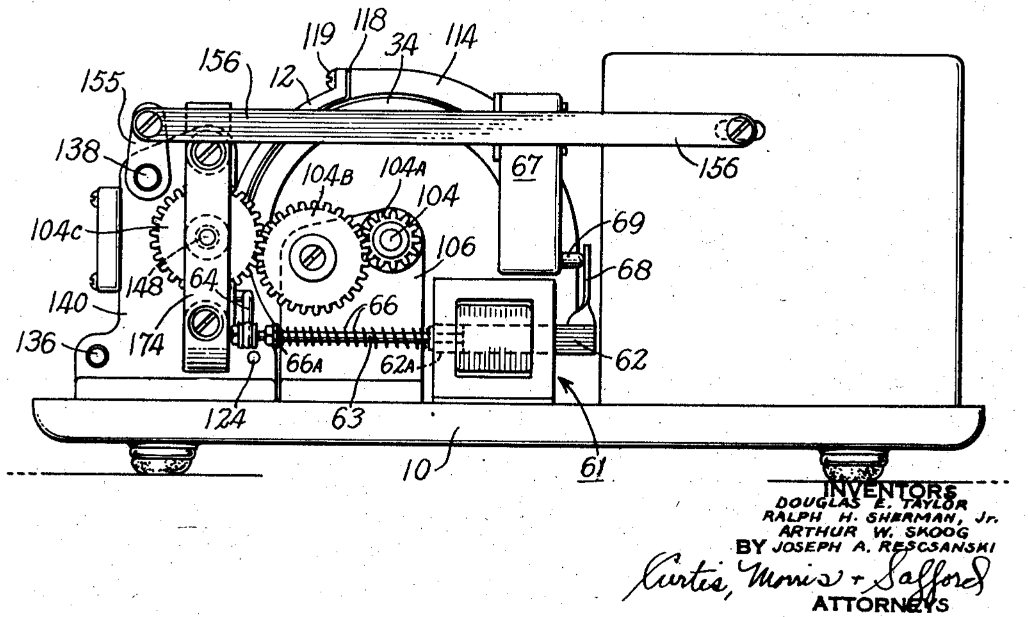
Figure 6 is a side elevational view of the dictating machine as seen from the right of Figures 2 and 3.
Figure 7:
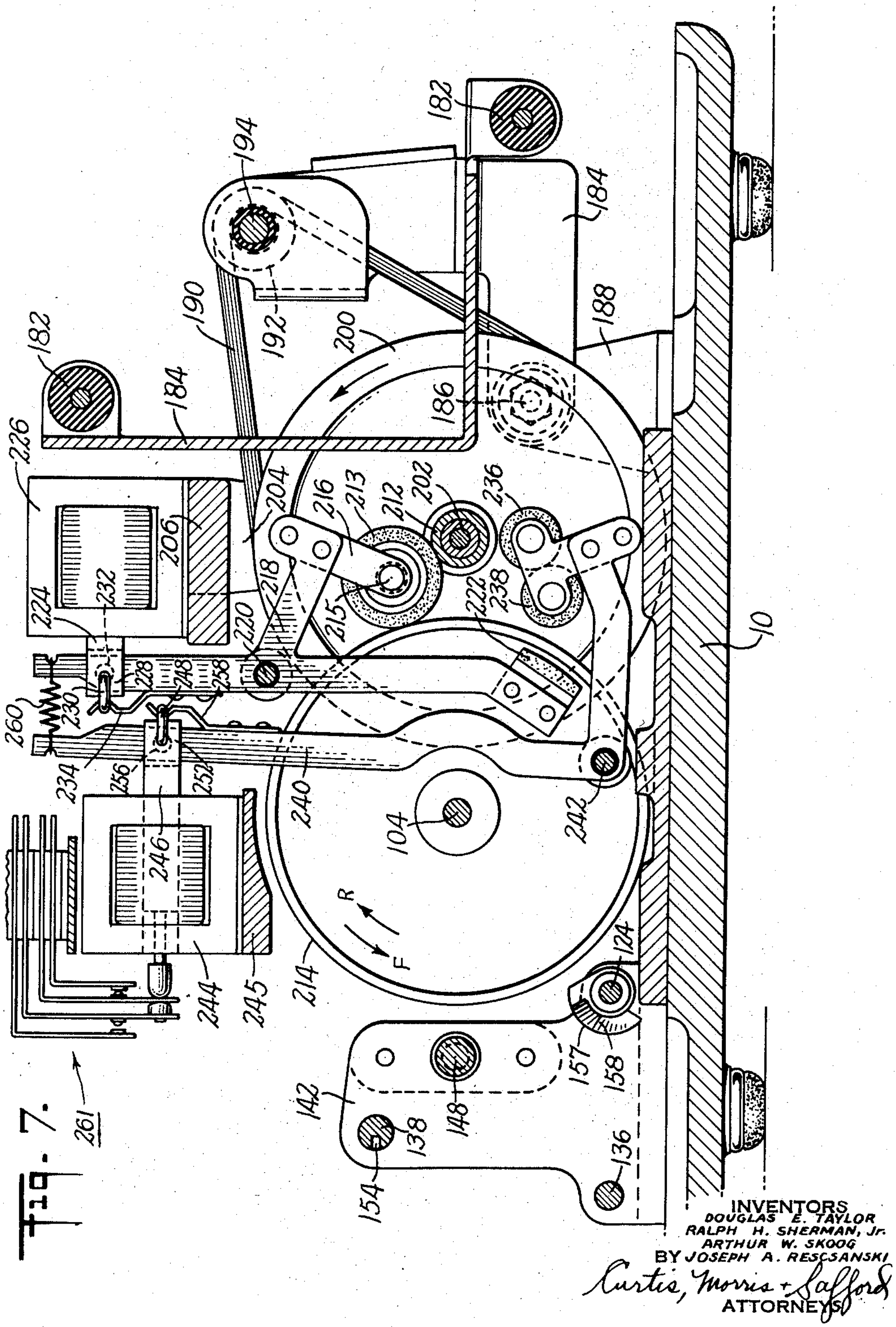
Figure 7 is an enlarged sectional view taken along line 7—7 of Figure 2 showing the clutch mechanism for starting, stopping, and reversing the direction of rotation of the record-supporting mandrel.

MANDREL DRIVING AND CLUTCH ARRANGEMENT (*Figures 2, 5 and 7*)

Driving power for the mandrel 34 is provided by an electric motor 180 (Figures 2 and 5) which is mounted on shock absorbing supports 182. These supports are, in turn, supported by a frame assembly 184 which is pivotally secured, by suitable rubber shock absorbing material and bolts 186 to two spaced frame members 188, best shown in Figures 5 and 7, extending upwardly from the base 10.

The center of gravity of the motor and frame 184 is such that it would tend to pivot about the bolts 186 in a counter-clockwise direction as seen in Figure 5, but is restrained by a drive belt 190 which encompasses a pulley wheel 192 (Figure 2), secured to the drive shaft 194 of the motor 180, and extends around a groove in the rim of a large pulley wheel 200 (see also Figure 5).

This pulley wheel is mounted on an axle 202 projecting from the standard 86 and is supported at its outer end by a frame member 204 extending downwardly from a horizontally-extending bracket portion 206 of the standard 86.

The side of the motor frame assembly 184 nearest the rear of the dictating machine is provided with a downwardly and rearwardly extending L-shaped bracket 207 (Figure 5) having a forked end portion that engages a rubber shock-absorbing bushing 208 surrounding a screw 209 extending upwardly from the base 10. A nut 210 on the screw 209, which presses downwardly on the bushing 208, is provided to permit adjustment of the tension on the drive belt 190.

A fly wheel 211 (Figure 2) mounted on the motor drive shaft 194 helps to maintain an even motor speed to smooth the torque delivered by the driving system and assures that the mandrel 34 will rotate at a constant speed unaffected by momentary variations in the power delivered by the motor 180.

As best shown in Figure 7, the pulley wheel 200 carries a smaller drive pulley 212 which is engaged, when the mandrel is being driven in the forward direction, by a friction roller 213 that engages also the surface of a mandrel drive pulley 214 secured to the mandrel drive shaft 104.

The friction roller 213 is rotatably supported on an axle 215 carried by an arm 216 which is secured to a Y-shaped bell-crank 218 pivotally supported at 220 on the standard 86. The other branch of the Y-shaped bell-crank 218 carries a friction brake 222 having a surface of suitable braking material arranged to make contact with the inner surface of the rim of the mandrel drive pulley 214. Thus, when the bell-crank 218 is rotated in a clockwise direction, as seen in Figure 7, the friction roller 213 engages the drive pulley 212 and the outer surface of the mandrel pulley 214 to rotate the mandrel 34 in its forward direction. When this bell-crank 218 is rotated in the counter-clockwise direction, the friction roller 213 is disengaged and the brake 222 is moved into contact with the interior surface of the rim of the mandrel pulley 214 bringing the mandrel to an abrupt stop.

In order to control the movement of the bell-crank 218, the armature 224 of a forward solenoid 226 is provided with a U-shaped end portion 228. One leg of a C-shaped pin 230 extends across the gap between the spaced arms formed by the U-shaped end portion 228 of the armature 224 and through a hole 232 near the upper end of the bell-crank 218 that is substantially larger than the diameter of the pin 230. The other leg of the pin 230 engages the outer surface of a leaf spring 234 secured to the bell-crank 218.

When the forward solenoid 226 is energized, the armature 224 is drawn into the solenoid 226 and the coupling pin 230 applies, through the leaf spring 234, a clockwise rotary force to the bell-crank 218, disengaging the brake 222 and engaging the friction roller 213 to drive the mandrel 34 in its forward direction, the force applied to the friction roller 213 being limited by the resiliency of the spring 234, rather than by the actuating force of the solenoid 226, so that sufficient energization current can be applied to the solenoid 226 to insure instantaneous response without exerting excessive pressure on the friction roller 213.

In order to reverse the direction of rotation of the mandrel 34, two friction rollers 236 and 238, smaller in diameter than the friction roller 213, are rotatably mounted in engagement with each other on a bell crank 240, pivotally supported at 242 on the standard 86. When the bell-crank 240 is rotated in a counterclockwise direction, as seen in Figure 7, the friction roller 236 engages the drive pulley 212 and the friction roller 238 engages the outer surface of the mandrel pulley 214, the extra friction roller causing the mandrel pulley 214, and accordingly the mandrel 34, to rotate in the reverse direction from the direction of rotation produced by the single friction roller 213.

Movement of the reversing bell-crank 240 is controlled by a reverse solenoid 244, which is supported by a horizontal extension 245 on the standard 86, the armature 246 of the solenoid 244 being connected to the bell-crank 240 by a coupling arrangement similar to that described in connection with the forward solenoid 226. A C-shaped coupling pin 248 extends between the spaced ears 252 of the armature 246 through a hole 256 in the bell-crank 240 of substantially larger diameter than the diameter of the coupling pin 248. The forward end of the coupling pin 248 engages the outer surface of a leaf spring 258 secured to the bell-crank 240.

When the forward solenoid 226 is deenergized and the reverse solenoid 244 is energized, the armature 246 is drawn into the solenoid 244 and the coupling pin 248 applies, through the leaf spring 258, a counterclockwise rotary force to the bell-crank 240, engaging the friction rollers 236 and 238, respectively, with the drive pulley 212 and the mandrel drive pulley 214, thus causing the mandrel to rotate in a reverse direction. It will be noted that when the forward solenoid 226 is deenergized, that the brake 222 is automatically engaged and that it remains engaged when the mandrel 34 is being driven in reverse direction. This reduces the speed of rotation of the mandrel in the reverse direction, so that any danger of the sheet record buckling or becoming jammed during the ejection process is eliminated.

The upper ends of the bell-cranks 218 and 240 are joined by a helical tension spring 260. In operation, when neither the forward solenoid 226 nor the reversing solenoid 244 is energized, the spring 260 pulls the upper ends of the bell-cranks 218 and 240 toward each other so that neither the forward friction roller 213 nor the reverse friction rollers 236 and 238 makes contact with either the drive pulley 212 or the surface of the mandrel pulley 214. This arrangement prevents the friction rollers from becoming permanently deformed or flattened, which would cause uneven driving of the mandrel 34. This spring bias also causes the braking surface 222 to engage the main drive pulley 214, thus holding the mandrel 34 firmly in position, so that when the mandrel has been positioned correctly for inserting a record into the machine, it will not be moved inadvertently before or at the time a record is placed in the machine.

The armature 246 of the reverse solenoid 244 is connected also to operate a switch, generally indicated at 261, connected in two circuits utilized in the automatic cycle control of the machine. The function of this switch 261 will be described in detail in connection with the operating circuits shown in Figure 24.

Power is applied to the lead screw 148 from the mandrel drive shaft 104 through a gear train at the right of the machine. One end of the drive shaft 104, which extends through the standard 106 carries a gear 104A (Figure 6) which engages an intermediate gear 104B, rotatably supported by the standard 106, that in turn drives a gear 104C which is secured to one end of the lead screw 148.

THE COMMUTATOR SWITCH

(*Figures 9 and 14*)

In order to control the electrical circuits (to be described later) by which the mandrel is stopped in its "index position" before a record is inserted, and by which it is positioned within a predetermined angular range before being driven in reverse to eject a record, a commutator or drum type switch, generally indicated at 262 in Figure 14, is operated in synchronized relationship with the mandrel 34.

The mandrel drive shaft 104 which is driven by the mandrel pulley 214 is rotatably supported by the standards 86 and 106 and carries, near the standard 86, the commutator switch. This commutator switch carries two commutator segments (see also Figure 9) 264 and 266, and two slip rings or contact drums 268 and 270 each separated by insulating spacers 272. Four wipers or brushes 274, 276, 278, and 280 are arranged to engage, respectively, under suitable spring pressure, the commutator segments 264 and 266 and the slip rings 268 and 270.

The slip rings 268 and 270 have continuous outer conductive portions and are utilized for making connection to the record-operated switches 50 and 51 carried by the mandrel 34. The commutator segments 264 and 266 are utilized for positioning and controlling the operation of the mandrel when records are inserted into or removed from the mandrel. These commutator segments will be discussed in detail in connection with the electrical circuits of Figure 24.

THE ELECTRICAL CIRCUITS

(*Figure 24*)

Power for the control circuits of the machine is obtained from conventional alternating current power mains 300 and 302 which are connected through a main switch 304 to a conventional rectifier-filter arrangement, generally indicated at 306, including a half-wave dry rectifier 308, a series filter-resistor 310, a shunt condenser 312, and a bleeder resistor 314, all connected in the usual manner.

Operation of the electrical circuits can be most readily explained by assuming, first, that a record 4 is on the mandrel 34 and that the dictation has been completed so that it is now desired to eject the record. This is accomplished by moving the carriage 132 all the way to the left.

The carriage in this position closes the contacts of the carriage-operated switch 162 (shown also in Figure 3) and completes a circuit from a positive supply lead 316, connected to the rectifier 308, through the carriage-operated switch 162, a lead 317, the energizing winding 318 of a carriage switch relay, generally indicated at 320, (shown also in Figure 5) to a negative supply lead 322 which is connected to supply main 300.

If the commutator switch 262 is in the position shown in Figure 24, the energizing of the carriage switch relay 320 energizes the reverse solenoid 244 through a circuit which extends from the supply lead 316 through the carriage switch 162, the lead 317, a lead 324, the reverse commutator segment 264 of the commutator switch 262, the wiper 274, a lead 330, the energizing winding of the reverse solenoid 244 (shown also in Figure 7), a lead 332, the normally closed switch contact electrodes 334 and 336 of a thermal time delay unit 338, a lead 340, and a contact point 342 and movable armature 344 of the carriage switch relay 320 to the other power supply lead 322. The energization of the reverse solenoid, as explained above, causes rotation of the mandrel 34 in its reverse direction to eject the record 4.

The chute-actuating solenoid 94 (shown also in Figure 8) is connected in parallel with the reverse solenoid 244, so that whenever the mandrel 34 is driven in reverse direction the chute assembly is positioned for ejection of the record.

At the instant the reverse solenoid 244 is energized it operates the switch 261 (shown also in Figures 5 and 7) to complete a holding circuit that maintains the energization of the reverse solenoid 244 independently of the commutator switch 262. This circuit can be traced from the lead 330 at the terminal of the reverse solenoid 244 through a switch contact 348 and a movable arm 350 of the reverse solenoid switch 261, and a lead 352 to the lead 324. Thus, this holding circuit is in shunt with the circuit through the reversing commutator segment 264, so that once effected the energization of the reverse solenoid 244 continues irrespective of the operation of the commutator switch 262.

If, at the instant the contacts of the carriage switch 162 are closed by the movement of the carriage 132 to its "control position," the mandrel 134 is not in the correct position for ejecting the record, the wiper 274 will be on the non-conductive portion of the reversing commutator segment 264, indicated by shading lines in the drawing, and the reversing solenoid 244 will not be energized. However, the forward solenoid 226 will be energized, to rotate the mandrel 34 in its forward direction, by a circuit extending from the power supply lead 316 through the carriage-operated switch 162, the lead 317, the lead 324, the forward commutator segment 266, the wiper 276, a lead 358, a movable arm 360 and a fixed contact 362 of the reverse solenoid switch 261, the forward solenoid 226, and a lead 365 to the other power supply lead 322.

The mandrel 34 thus may rotate in its forward direction for a part of one revolution until the wiper 274 makes contact with the conductive portion of the reversing commutator segment 264 and completes the circuit for energizing the reverse solenoid 244. Upon energization of the reverse solenoid, the initial movement of its armature actuates the reverse solenoid switch 261 and opens the circuit through the arm 360 and contact 362 by which the forward solenoid is energized. The mandrel 34 is then driven in reverse direction to eject the record 4, as described above.

In order that the mandrel 34 will rotate in reverse direction only long enough to discharge the record 4, the reverse solenoid 244 is energized through the thermal delay unit 338 which is arranged to open this circuit after the reverse solenoid 244 has been energized for three or four seconds, that is, after a sufficient interval to insure that the record 4 has been ejected.

When the carriage switch relay 320 is energized, by movement of the carriage assembly 132 to the "control position," it completes a circuit to a heating element 364 in the thermal delay unit 338.

This circuit starts at one terminal of the secondary winding 366 of a step-down power transformer 368, the primary winding 372 of which is connected to the power supply mains 300 and 302, and extends through a lead 374, a movable arm 376 and a fixed contact 378 of the carriage switch relay 320, the heating element 364, and a lead 380 to the other terminal of the transformer secondary 366.

When the heater element 364 is energized, it gradually increases the temperature of the unit 338 and after a few seconds opens the circuit between the contact elements 334 and 336, one of which may include, for example, a bi-metallic temperature-responsive element, thereby deenergizing the reverse solenoid 244. This circuit will remain open so long as the carriage remains in its "control position" so that the heating element 364 continues to be energized.

If, at the instant the reverse solenoid 244 is de-energized, the mandrel 34 is not positioned correctly for loading a record on the machine, the wiper 276 will be in contact with the conductive portion of the forward commutator segment 266 of the commutator switch 262. The forward solenoid 226 will then be energized, through the circuit described above, causing the mandrel 34 to rotate in its forward direction until the wiper 276 leaves the conductive portion of the commutator segment 266, at which time the mandrel 34 will be stopped and will be indexed correctly for the loading of the next record.

When a record is to be placed in the machine, the carriage assembly 132 is moved to its "control position," energizing the carriage switch relay 320 and insuring that the mandrel 34 will be positioned correctly by means of the circuits described above. The carriage switch 162 is arranged in series with the circuits that operate the loading mechanism so that this mechanism will not operate unless the carriage is positioned correctly.

When a record 4 is inserted into the loading chute, the leading edge of the record actuates the record switches 50 and 51 (shown also in Figure 14), which are connected in series, to actuate the cradle control solenoid 61 (shown also in Figure 6) through a circuit that can be traced from the power supply lead 316 through the carriage-operated switch 162, the record-operated switches 50 and 51, the energizing winding 382 of the cradle control solenoid 61, and the two contact elements 384 and 386 of a thermal time delay unit 388, similar to unit 338, to the other power supply lead 322.

Energization of the cradle control solenoid 61 lifts the cradle fingers 32 (see also Figure 18) to position the leading portion of the record 4 adjacent the surface of the mandrel 34, and also operates the cradle switch 67.

At the instant the record-operated switches 50 and 51 energize the cradle control solenoid 61, a holding circuit is completed from the power supply lead 316 through the carriage-operated switch 162, the lead 324, a lead 390, a fixed contact 392 and a movable arm 394 of the cradle switch 67, the energizing winding 382 of the cradle control solenoid 61, and the forward time delay unit 388 to the other power supply lead 322. Thus, the cradle control solenoid remains energized even though movement of the record 4 by the cradle fingers 32 allows the switches 50 and 51 to open.

Energization of the cradle control solenoid 61 completes a circuit to the forward solenoid 226 that can be traced from the power supply lead 316 through the carriage switch 162, the lead 324, the lead 390, a fixed contact 396 and a movable arm 398 of the cradle switch 67, a lead 400, the forward solenoid 226, and the lead 365 to the other power supply lead 322. The mandrel 34, therefore rotates in a forward direction to wrap the inserted record around the mandrel in recording position.

When the cradle control solenoid 61 is energized, it completes a circuit to the heating element 402 of the forward time delay unit 388 through a circuit connected from one terminal of the transformer secondary winding 366 through the lead 374, a movable arm 404 and a fixed contact 406 of the cradle switch 67, the heating element 402, and the lead 380 to the other terminal of the transformer winding 366. After the heating element 402 has been energized for a few seconds, allowing the mandrel 34 to make a few revolutions and secure the record 4 in recording position, the contact elements 384 and 386 of the thermal delay unit 388 open the circuit by which the cradle control solenoid 61 is energized, thus de-energizing the forward solenoid 226 and stopping the mandrel 34. The mandrel then remains at rest until the carriage assembly 132 is moved toward the right to place the recording head 120 in recording position.

When the carriage is moved away from its left-hand "control position," the carriage-operated switch 162 opens, deenergizing the carriage switch relay 318 and placing the rotation of the mandrel 34 under the control of a manually-operated switch 408. This control circuit can be traced from the power supply lead 316 through the switch 408, a lead 410, a movable arm 412 and a fixed contact 414 of the carriage switch relay 320, a lead 416, the forward solenoid 226, and the lead 365 to the other power supply lead 322.

From the foregoing, it will be observed that the dictating machine embodying the present invention is well adapted for the attainment of the ends and objects hereinbefore set forth and to be economically manufactured, since the separate features are well suited to common production methods; and that the machine is entirely practical for its intended application. It is apparent that the illustrated machine is subject to a variety of modifications as may be desirable in adapting the invention to different applications and that various features of the invention may be utilized to advantage without a corresponding use of other features.

What is claimed is:

1. In a dictating machine adapted to utilize records in sheet form and wherein during operation the records are supplied to a scanning portion of the machine wherein sound signals are recorded on or reproduced from the records and then the records are removed from the scanning portion of the machine, a chute assembly for inserting records into and removing them from the scanning portion of the machine comprising means defining a record-insertion channel, means defining a separate record-ejection channel, and movable partition means forming part of each of said channel defining means arranged when in a first position to form the top of one of said channels while effectively closing off the other channel and when in a second position effectively to close off said one channel while opening said other channel and acting to form the bottom of the other of said channels, whereby the records are enabled to be quickly and accurately inserted into and ejected from the scanning portion of the machine.

2. In a sound recording or reproducing machine adapted to utilize flexible records in sheet form, apparatus for inserting records into the machine in accurate alignment and removing them from the machine comprising a revolvable record-supporting surface, means defining a record-insertion channel, means defining a record-ejection channel, movable partition means forming part of each of said channel defining means arranged when in a first position to form the top of one of said channels and when in a second position to form the bottom of the other of said channels, record-positioning means forming an extension of said record-insertion channel, said record positioning means being shaped to conform to a portion of said surface and means movably supporting said record-positioning means for movement between a record-receiving position wherein the record inserted through said record-insertion channel is received by said record-positioning means and a record-loading position wherein the record-positioning means is positioned snugly adjacent said surface to permit said record-supporting surface to engage the record in accurate alignment.

3. In a recording or reproducing machine adapted to utilize flexible sheet records, a record-handling mechanism comprising a supporting base, revolvable means mounted on said base for supporting a sheet record during recording or reproducing, upper and lower record-guiding means supported by said base, intermediate record-directing means positioned between said upper and lower record-guiding means and movable between record-inserting and record-ejecting positions, supporting means movably supporting said record-directing means from said base, a record-positioning cradle having a curved record-receiving portion extending beyond said record directing means toward said record-supporting means, and cradle-actuating means arranged to move said cradle between record-receiving and record-loading positions, said curved portion of said cradle extending in close proximity to the surface of said record-supporting means when said cradle is in said record-loading position and being removed therefrom when said cradle is in said record-receiving position.

4. In a dictating machine adapted to utilize flexible sheet records, a record-handling mechanism comprising a rotatable mandrel for supporting a sheet record during recording or reproducing, a chute assembly for guiding the sheet records when inserting or ejecting them and for positioning the records on said mandrel comprising a lower guide plate, means supporting said lower guide plate, an intermediate guide plate positioned above said lower guide plate and movable between a record-inserting position wherein it is closely spaced above said lower guide plate and a record-ejecting position, an upper guide plate positioned above said intermediate guide plate, record-positioning cradle means having a curved record-receiving portion extending beneath said mandrel, and means pivotally supporting said intermediate guide plate, said intermediate guide plate being arranged to abut said cradle means and said lower guide plate when moved downwardly from record-inserting to record-ejecting position thereby to carry said lower guide plate and said cradle downwardly and condition said chute for ejection of the record through a relatively wide-mouthed channel between said upper and intermediate guide plates, said intermediate guide plate being arranged to permit a record to be inserted toward the mandrel through a relatively narrow channel defined by said lower and intermediate guide plates when said intermediate guide plate is in its upward record-inserting position, cradle-actuating means arranged to move said cradle between first and second positions, said curved portion of said cradle extending in close proximity to the surface of said mandrel when said cradle is in said first position accurately to transfer a record thereto and being removed therefrom when said cradle is in said second position, and chute-actuating means arranged to move said intermediate guide plate between record-inserting and record-ejecting positions.

5. In a dictating machine adapted to utilize flexible sheet records having a magnetic recording material on one surface thereof, a record-handling mechanism comprising a supporting base having a chute-receiving recess therein, a rotatable mandrel for supporting a sheet record during recording, a chute assembly positioned in said recess for use in inserting records into said machine and ejecting them therefrom including a movable lower guide plate having curved fingers, an intermediate guide plate positioned above said lower guide plate and movable between record-inserting and record-ejecting positions, spaced downwardly-extending flanges formed integrally with said intermediate guide plate, a supporting rod extending across said recess and pivotally supporting said intermediate guide plate, an upper guide plate supported by said base adjacent and above said intermediate guide plate, a record-positioning cradle having curved fingers, the fingers of said cradle being spaced and arranged to permit the end portions of its respective fingers to pass between corresponding fingers of said lower guide plate, a cradle-actuating rod spaced horizontally from said supporting rod and positioned beneath said lower guide plate and secured to said cradle, downwardly-extending ears on said lower guide plate pivotally engaging said cradle-actuating rod for positioning the lower guide plate, said intermediate guide plate being arranged to abut said cradle-actuating rod when moved downwardly from record-inserting to record-ejecting position thereby to carry said lower guide plate and said cradle downwardly and condition said chute for ejection of the record from said mandrel through a channel between said upper and intermediate guide plates, and a spring positioned between said lower guide plate and the floor of said recess and arranged to return said lower guide plate and said cradle to record-insertion position when said intermediate guide plate is moved upwardly to permit insertion of a record through a channel defined by said lower and intermediate guide plates and said downwardly-extending flanges, a cradle-actuating solenoid connected to said cradle-actuating rod and arranged to move said cradle between first and second positions, said cradle fingers extending in close proximity to the surface of said mandrel when said cradle is in said first position and being removed therefrom when said cradle is in said second position, and a chute-actuating solenoid arranged to rotate said intermediate guide plate about said supporting rod between record-inserting and record-ejecting positions.

6. In a sound recording or reproducing machine adapted to utilize a flexible sheet record having means defining a pre-formed hole therein, a record-positioning mechanism comprising a mandrel for supporting the record, a record-engaging member on said mandrel adapted to engage said hole, a record-positioning cradle, driving means for moving said cradle between first and second positions, at least a portion of said cradle extending close to said mandrel when in its second position and being removed therefrom when in its first position, and guide means for positioning on said cradle at least a portion of a record that is to be supported by said mandrel, said portion of the record including said hole, indexing mechanism placing said mandrel in stationary position with said record-engaging member adjacent to said cradle, whereby movement of said cradle to said second position places the record in position for said hole accurately to engage said record-engaging member on said mandrel.

7. In sound recording or reproducing apparatus in which a sheet-like record is utilized, record handling apparatus comprising a rotatable record-supporting mandrel having record-engaging means thereon, electrically-operated driving means for rotating said mandrel, a carriage, slidable means supporting said carriage for movement along said mandrel, a recording head carried by said carriage, forward and reverse clutch mechanisms arranged to engage said driving means to rotate said mandrel respectively in forward or reverse direction, a chute assembly terminating adjacent said mandrel and having a first condition of operation wherein it is adapted for the insertion of records to be engaged by said record-engaging means and a second condition of operation wherein it is adapted for the ejection of records delivered to it by reverse rotation of said mandrel, said mandrel having a predetermined loading position wherein said record-engaging means are positioned to engage records inserted through said chute and a predetermined ejection position wherein said record-engaging means are positioned to eject a record from said mandrel into said chute upon reverse rotation of said mandrel, an electrically-operated control unit for placing said chute assembly in either its first or its second condition of operation, a switch responsive to the placing of said carriage in a predetermined position for energizing said control unit to place said chute assembly in its second condition of operation, and a sequence control circuit arranged to be initiated by said switch for successively energizing said reversing clutch mechanism when said mandrel is in said ejection position, stopping said mandrel, and positioning said mandrel in its loading position.

8. In a sound recording or reproducing machine adapted to utilize a flexible sheet record, a record-positioning mechanism comprising a mandrel for supporting a sheet record, record-engaging means carried by said mandrel, driving means for rotating said mandrel, a clutch for disengaging said mandrel from said driving means, a cradle, cradle-control means for moving said cradle between first and second positions, at least a portion of said cradle extending close to said mandrel when in its second position and being removed therefrom when in its first position, switch means under the control of said mandrel and having alternate open and closed positions bearing a predetermined relationship to the angular position of said mandrel, clutch-control means under the control of said switch means and arranged to stop the rotation of said mandrel and position said record-engaging means adjacent the position occupied by said cradle when it is in its second position, and record-loading guide means for positioning on said cradle the portion of the record that is to be engaged by said mandrel, whereby movement of said cradle to said second position places the record in position for transfer to said mandrel.

9. In a sound recording or reproducing machine adapted to utilize a sheet record, a record-loading mechanism for accurately positioning a sheet record in the machine comprising a rotatable mandrel for supporting a record during recording or reproducing, a loading chute for receiving records and directing them to said mandrel, a switch carried by said mandrel and arranged to be actuated by a record in said loading chute in a predetermined position with respect to said mandrel, and means under the control of said switch for initiating rotation of said mandrel.

10. In a sound recording machine adapted to utilize a sheet record, a record-loading mechanism comprising a rotatable mandrel for supporting a record during recording or reproducing, a loading chute for receiving records and directing them to said mandrel, first and second switches carried by said mandrel at predetermined spaced points on said mandrel and arranged to be actuated by a record in said loading chute in a predetermined position with respect to said mandrel, a circuit connecting said switches in series, and means under the control of said circuit for initiating rotation of said mandrel, whereby said mandrel begins rotation only when both of said switches are actuated.

11. In a sound recording machine adapted to utilize a sheet record, a record-loading mechanism comprising a rotatable mandrel for supporting a record during recording or reproducing, a loading chute for receiving records and directing them to said mandrel, a switch carried by said mandrel and arranged to be actuated by a record in said loading chute in a predetermined position with respect to said switch and said mandrel, electrical drive means for rotating said mandrel, means under the control of said switch for energizing said drive means to cause rotation of said mandrel, a holding circuit under the control of said switch for maintaining energization of said drive means once it is started by said switch, and circuit means including a thermal time-delay device arranged to stop the rotation of said mandrel a predetermined interval after the actuation of said switch.

12. In a sound recording machine adapted to utilize a sheet record, a record-loading mechanism comprising a rotatable mandrel for supporting a record during recording or reproducing, an indexing mechanism placing said mandrel in a predetermined stationary position, a loading chute for receiving records and directing them to said mandrel, a switch carried by said mandrel, a switch-actuating member extending into the path of a record being inserted into said chute arranged to engage the leading edge of the sheet record and arranged to actuate said switch when the leading edge of the inserted record reaches a predetermined position with respect to said mandrel, a movable cradle forming part of said chute and having first and second positions, said cradle having a record-positioning portion extending adjacent said mandrel when in its second position and removed therefrom when in its first position, and cradle actuating means being under the control of said record-operated switch arranged to move said cradle from its first to its second position thereby to position the record correctly for transfer of said stationary mandrel.

13. In a sound recording or reproducing machine adapted to use flexible sheet records, apparatus comprising a rotatable mandrel for supporting a sheet record when recording or reproducing, a translating head, a movable carriage supporting said translating head for movement along a path parallel with the surface of said mandrel, a chute assembly having a record-insertion channel extending adjacent said mandrel so that records can be fed onto the mandrel through said channel, movable bridging means having first and second positions, said bridging means extending into said channel in position to prevent the passage of records therealong when in said second position and being removed therefrom when in said first position, whereby said channel can be closed when a record is on said mandrel so that a second record cannot inadvertently be fed into the machine, and means under the control of said carriage for moving said bridging means between its first and second positions.

14. In a sound recording or reproducing machine adapted to use a sheet record, apparatus comprising a translating head, a rotatable mandrel for supporting a sheet record, a chute assembly having a record-insertion channel extending adjacent said mandrel so that records can be fed onto the mandrel through said channel, circumferential record-guiding means adjacent said mandrel for maintaining the sheet record in close contact with the mandrel surface and having a transverse opening therein, and movable bridging means having a first position extending across said opening in said record-guiding means to prevent jamming when inserting or ejecting sheet records and a second position extending into said channel during sound recording or reproducing in position to prevent the passage of records therealong, whereby said channel can be closed when a record is on said mandrel so that a second record cannot be fed inadvertently into said machine.

15. In phonograph apparatus of the type using flexible sheet-like records, record loading apparatus comprising a record supporting mandrel, driving means for rotating said mandrel, a mandrel control mechanism including a friction roller for coupling said driving means to said mandrel, a friction brake arranged to apply a removable braking force to said mandrel, and a solenoid having a movable armature connected to said friction roller and to said friction brake and having a first position wherein said brake is engaged and said friction roller is disengaged and a second position wherein said brake is disengaged and said friction roller is engaged, record-directing means for directing a sheet record toward said mandrel, a switch having an arm extending into the path of a record being directed by said record-directing means and responsive to the positioning of a record therein in predetermined orientation with respect to the mandrel, and electrical control means responsive to the actuation of said record-operated switch arranged to operate said solenoid from its first to its second position.

16. In phonograph apparatus adapted for sound recording or reproducing, apparatus for handling flexible sheet-like records comprising a rotatable mandrel for supporting a sheet record during the recording or reproducing operation, a chute assembly terminating adjacent said mandrel for directing records being inserted into or removed from said apparatus, mandrel driving means including an electrically operated power transmission having a first condition of operation in which said mandrel is driven in a forward direction for loading records onto said mandrel and for driving the mandrel when recording or reproducing and a second condition of operation in which said mandrel is driven in the reverse direction for ejecting records from the apparatus, a brake arranged to apply a frictional retarding force to said mandrel driving means, control means for shifting said power transmission from its first to its second condition of operation, and means under control of said control means for engaging said brake whenever said power transmission is shifted from its first condition of operation, whereby frictional braking force applied to said driving means slows the mandrel when it is being driven in reverse direction to prevent buckling or jamming of the record being ejected.

17. In a sound recording or reproducing machine wherein sound signals are recorded on a flexible record, apparatus comprising a rotatable mandrel for supporting a record during the recording or reproducing operation, means on said mandrel for engaging a record, a chute assembly for directing a record to said mandrel for engagement therewith and from said mandrel for ejection therefrom, an electrically-controlled forward drive mechanism for rotating said mandrel in a forward direction for wrapping the record around the mandrel and for recording, an electrically-controlled reverse drive mechanism for rotating said mandrel in reverse direction for ejecting the record from said mandrel, first and second electrical circuits for energizing, respectively, said forward and reverse drive mechanisms, and a switch included in said first circuit and under the control of said reverse drive mechanism for deenergizing said forward drive mechanism when said reverse drive mechanism is energized, thereby to prevent operation of the forward drive mechanism when the reverse drive mechanism is energized.

18. In a dictating machine for recording and reproducing sound signals, the combination comprising a rotatable record-supporting mandrel, rotatable record-engaging means associated with said mandrel, electrically-operated driving means for rotating said record-engaging means, a carriage, slidable means supporting said carriage for movement along said mandrel, a recording head carried by said carriage, a manually-adjustable control lever having record, reproduce, and neutral positions for adjusting the position of said head relative to said mandrel, a control circuit arranged to energize said driving means to rotate said record-engaging means in either forward or reverse direction, a switch arranged to be actuated by movement of said carriage to a terminal position, said switch forming a part of said control circuit and being arranged to cause rotation of said record-engaging means in reverse direction to eject the record, and a lock preventing movement of said control lever from its neutral position when said carriage is in its terminal position.

19. In a dictating machine for recording and reproducing sound signals, the combination comprising a rotatable record-supporting mandrel, rotatable record-engaging means associated with said mandrel, electrically-operated driving means for rotating said record-engaging means, a carriage, slidable means supporting said carriage for movement along said mandrel, a recording head carried by said carriage, a manually-adjustable control lever having record, reproduce, and neutral positions for adjusting the position of said head relative to said mandrel, a control circuit arranged to energize said driving means to rotate said record-engaging means in either forward or reverse direction, a switch arranged to be actuated by movement of said carriage to a terminal position, said switch forming a part of said control circuit and being arranged to cause rotation of said record-engaging means in reverse direction to eject the record, and a slotted member having opposed convergent cam surfaces arranged to intercept said control lever as said carriage is moved toward said terminal position and move said lever toward and lock it in its neutral position.

20. In a sound recording or reproducing machine adapted to utilize flexible sheet records having a plurality of abutment means therein by which the record is engaged and driven, record handling apparatus comprising a rotatable mandrel, electrically-operated drive means for rotating said mandrel, a plurality of record-engaging means carried by said mandrel and adapted to engage corresponding abutment means in said sheet records, a chute assembly terminating adjacent said mandrel for directing records to and from said mandrel, and a switch carried by said mandrel having an actuating lever extending into the path followed by a record traversing said chute assembly toward said mandrel, said switch forming part of said electrically-operated driving means and being arranged to initiate rotation of said mandrel when said lever is moved to a predetermined position by the leading edge of a record being inserted into said chute assembly, the distance along the face of said mandrel from said predetermined position of said lever to the nearest of said record-engaging means being equal to the distance from the leading edge of said record to an adjacent abutment means therein.

21. In a sound recording or reproducing machine adapted to utilize flexible sheet records having a plurality of sprocket holes therein by which the record is engaged and driven, record handling apparatus comprising a rotatable mandrel, electrically-operated drive means for rotating said mandrel, a plurality of sprockets carried by said mandrel and adapted to engage corresponding sprocket holes in said sheet records, a chute assembly terminating adjacent said mandrel for directing records to and from said mandrel, a switch carried by said mandrel having an actuating lever extending through a slot in said mandrel into the path followed by a record traversing said chute assembly toward said mandrel, said switch forming part of said electrically-operated driving means and being arranged to initiate rotation of said mandrel when said lever is moved to a predetermined position by the leading edge of a record being inserted into said chute assembly, and an abutment extending outwardly from said mandrel and positioned to limit the movement of said lever substantially at said predetermined position, the distance along the face of said mandrel from said predetermined position of said lever to the nearest of said record-engaging sprockets being equal to the distance from the leading edge of said record to an adjacent sprocket hole therein.

22. In a sound recording or reproducing machine adapted to utilize flexible sheet-like records, an indexing mechanism comprising a rotatable record-supporting mandrel, record-engaging means on said mandrel, mandrel drive means for rotating said mandrel in either forward or reverse direction, record-directing means normally conditioned for guiding records toward said mandrel for engagement with said record-engaging means, electrically-operated chute ejection-conditioning means for conditioning said record-directing means to receive a record released by reverse rotation of said mandrel, a commutator switch having forward and reverse segments, means driving said commutator switch in synchronized relationship with said mandrel, a first drive control circuit including said forward commutator switch segment adapted to energize said drive means to rotate said mandrel in its forward direction, a second drive-control circuit including said reverse commutator switch segment adapted to energize said drive means to rotate said mandrel in its reverse direction to eject a record, said second drive-control circuit being arranged to energize said electrically-operated chute ejection conditioning means to receive the ejected record, and a sequence-control circuit arranged to interrupt said second drive-control circuit after the mandrel has rotated in reverse to eject the record and energize said first drive-control circuit for rotating said mandrel in a forward direction under the control of said forward commutator segment thereby to position said mandrel in a predetermined position suitable for engagement of another record with said record engaging means, following ejection of the first-mentioned record.

23. In a phonograph apparatus adapted to utilize sheet records, a record loading mechanism comprising a rotatable record-supporting mandrel, record engagement means carried by said mandrel, a record-loading chute assembly terminating adjacent said mandrel for directing records into position for engagement with said mandrel, said mandrel having a predetermined loading position wherein said record engagement means is positioned to engage a record inserted into said chute, an indexing switch operated in synchronized relationship with said mandrel and having first and second positions, said indexing switch being arranged to move with rotation of said mandrel alternately between said first and second positions and to be in said second position during the time said mandrel is in said loading position, a first mandrel-driving circuit under the control of said indexing switch and being arranged to rotate said mandrel when said indexing switch is in its first position so as to position said mandrel in its loading position, a record-operated switch arranged to be actuated by the insertion of a record into said loading chute, and a second mandrel-driving circuit independent of said indexing switch and under the control of said record-operated switch and arranged to rotate said mandrel in its forward direction to wrap the inserted record around said mandrel.

24. In a phonograph apparatus adapted to utilize sheet records, a record loading mechanism comprising a rotatable record supporting mandrel, record engagement means carried by said mandrel, a record loading chute assembly terminating adjacent said mandrel for directing records into position for engagement with said mandrel, said mandrel having a predetermined loading position wherein said record engagement means is positioned to engage a record inserted into said chute, a carriage movable along said mandrel, a carriage-operated switch arranged to be actuated by said carriage when said carriage is in a predetermined position, a relay-switch operated by said carriage switch, an indexing switch operated in synchronized relationship with said mandrel and having first and second positions, said indexing switch being arranged to move with rotation of said mandrel alternately between said first and second positions and to be in said second position during the time said mandrel is in said loading position, a first mandrel-driving circuit under the control of said indexing switch and being arranged to rotate said mandrel when said indexing switch is in its first position so as to position said mandrel in said loading position, circuit means under the control of said relay-switch for rendering said first-mandrel driving circuit effective, a record-operated switch arranged to be actuated by the insertion of a record into said loading chute, a second mandrel-driving circuit independent of said indexing switch and under the control of said record-operated switch and arranged to initiate rotation of said mandrel in its forward direction to wrap the inserted record around said mandrel, a thermal time-delay unit having a heating element and arranged to interrupt said second mandrel-driving circuit, and means under control of said record-actuated switch for energizing said heating element to actuate said time-delay unit a predetermined interval of time after actuation of said record-operated switch.

25. In a phonograph apparatus adapted to utilize sheet records, a record handling mechanism comprising a rotatable record supporting mandrel, record engagement means carried by said mandrel, a record-ejecting chute assembly extending from said mandrel for receiving records ejected by reverse rotation of said mandrel, said mandrel having a predetermined ejecting position wherein said record engagement means is positioned correctly for ejection of the record when the mandrel is driven in reverse direction, a carriage movable along said mandrel, a carriage-operated switch, an indexing switch operated in synchronized relationship with said mandrel and having safety and ejection control positions, said indexing switch being arranged to move alternately between said safety and ejection control positions and to be in said ejection control position during the time said mandrel is in said ejecting position, a first mandrel-driving circuit under the control of said indexing switch and being arranged to rotate said mandrel in its forward direction when said indexing switch is in its safety position so as to prevent initiation of reverse rotation of said mandrel when said mandrel is incorrectly positioned for ejection and to position said mandrel in its correct ejecting position, and a second mandrel-driving circuit independent of said indexing switch and under the control of said carriage-operated switch and arranged to rotate said mandrel in its reverse direction to eject the record into said chute.

26. In a phonograph apparatus adapted to utilize sheet records, a record handling mechanism comprising a rotatable record supporting mandrel, record engagement means carried by said mandrel, a record-ejecting chute assembly extending from said mandrel for receiving records ejected by reverse-rotation of said mandrel, said mandrel having a predetermined ejecting position wherein said record engagement means is positioned correctly for ejection of the record when the mandrel is driven in reverse direction, a carriage movable along said mandrel, a carriage-operated switch, an indexing switch operated in synchronized relationship with said mandrel and having first and second positions, said indexing switch being arranged to move alternately between said first and second positions and to be in said second position during the time said mandrel is in said ejecting position, a first mandrel driving circuit under the control of said indexing switch and being arranged to rotate said mandrel in its forward direction when said indexing switch is in its first position so as to position said mandrel in its ejection position, a second mandrel-driving circuit independent of said indexing switch and under the control of said carriage-operated switch and arranged to rotate said mandrel in its reverse direction to eject the record into said chute, and a time-delay circuit arranged to render said second mandrel-driving circuit ineffective a predetermined interval after energization thereof.

27. In a dictating machine of the type utilizing flexible sheet-like records, an automatic record-handling mechanism comprising a rotatable mandrel for supporting a record during the recording or reproducing operation, a motor, electrically-operated reversible drive means for coupling said motor to said mandrel to rotate it in forward or reverse direction, forward and reverse drum-type indexing switches each having an arcuate conductive portion and a wiper, means operating said indexing switches in synchronized relationship with said mandrel, a record-operated switch positioned in the path of a record being inserted into said machine toward said mandrel, forward and reverse time-delay units each including normally-engaged contact members and means for disengaging said members a short interval after energization of the respective unit, a source of electric power, a record-ejection circuit including first circuit means comprising and under the control of said forward indexing switch and connecting said power source to said drive means for rotating said mandrel in forward direction, second circuit means including said reverse indexing switch and said contact members of said reverse time delay unit and connecting said power source to said drive means for rotating said record-engaging means in reverse direction, an interlock switch under the control of said drive means and arranged to interrupt said first circuit means when said drive means is energized for reverse rotation of said mandrel, a first holding circuit responsive to the energization of said drive means in reverse direction for maintaining said energization independently of said reverse indexing switch, and means responsive to the energization of said ejection circuit for energizing said reverse time delay to interrupt after a predetermined interval the energization of said drive means, and a record-loading circuit including said record-operated switch and said contact members of said forward time-delay unit and arranged to connect said power source to said drive to rotate said mandrel in forward direction, a second holding circuit responsive to the actuation of said record-operated switch arranged to maintain energization of said drive means in forward direction independently of said record-operated switch, and means responsive to the energization of said record-loading circuit arranged to energize said forward time delay unit thereby to interrupt said loading circuit after a predetermined interval.

28. In a dictating machine of the type utilizing flexible sheet-like records, an automatic record-handling mechanism comprising a rotatable mandrel for supporting a record during the recording or reproducing operation, rotatable record-engaging means on said mandrel, an electric motor, an electrically-operated forward clutch for coupling said motor to said mandrel to rotate it in forward direction, an electrically-operated reverse clutch for coupling said motor to said mandrel to rotate it in reverse direction, a cyclically-operated drum type indexing switch having a set of forward contacts and a set of reverse contacts, means operating said indexing switch in synchronized relationship with said mandrel, a record-operated switch positioned in the path of and arranged to be actuated by a record being inserted into said machine toward said mandrel, forward and reverse time-delay units each including normally-engaged contact members and means for disengaging said members a short interval after energization of the respective unit, a source of electric power, a record-ejection circuit including first circuit means comprising and under the control of said forward contacts of said indexing switch and connecting said power source through said forward contacts to said forward clutch for rotating said mandrel in forward direction, second circuit means including said reverse contacts of said indexing switch and said contact members of said reverse time delay unit and connecting said power source therethrough to said reverse clutch means for rotating said mandrel in reverse direction, an interlock switch under the control of said reverse clutch and arranged to interrupt said first circuit means when said reverse clutch is energized, a first holding circuit responsive to the energization of said reverse clutch arranged to maintain said energization independently of said indexing switch, and means responsive to the energization of said ejection circuit for energizing said reverse time delay unit to interrupt after a predetermined interval the energization of said reverse clutch, and a record-loading circuit including said record-operated switch and said contact members of said forward time-delay unit and arranged to connect said power source to said forward clutch, a second holding circuit responsive to the actuation of said record-operated switch arranged to maintain energization of said forward drive means independently of said record-operated switch, and means responsive to the energization of said record-loading circuit arranged to energize said forward time-delay unit thereby to interrupt said loading circuit after an interval of time sufficient to position a record on said mandrel.

29. In a sound recording and reproducing machine adapted to utilize a flexible sheet record, a control mechanism comprising a rotatable drum for supporting the record, driving means for said drum, a record-positioning cradle, electrically-operated cradle control means for moving said cradle between first and second positions, at least a portion of said cradle extending close to said drum when in its second position and being removed therefrom when in its first position, mechanically-operated switch means responsive to the movement of said cradle to its second position, and circuit means including and under the control of said switch means for actuating said drum driving means.

30. In a dictating machine of the type adapted to utilize records in sheet form and wherein the records are wrapped upon a record supporting surface in position to be scanned by a sound transducing head during sound recording and sound reproducing, apparatus for loading a record onto the record supporting surface in accurate alignment comprising: means defining a record supporting surface, a record insertion channel providing access to said supporting surface, a record-loading cradle near the inner end of said channel and near said record supporting surface, said cradle being movable from a first position spaced from said supporting surface to a second position adjacent said supporting surface for transferring a record thereto, a cradle-control for moving said cradle from its first to its second position, at least two record-actuated means, one of said record-actuated means being near one side of said record-loading cradle and arranged to be actuated by a first edge portion of a record on said cradle in properly aligned position for transfer to said record supporting surface, another of said record-actuated means being near the other side of said record-loading cradle and arranged to be actuated by a second opposed edge portion of the record on said cradle in properly aligned position for transfer to said record supporting surface, and a control for said cradle-control responsive to simultaneous actuation of said record-actuated means to cause movement of said cradle from its first to its second position, whereby said loading cradle positions the record on said supporting surface in accurate alignment for recording or reproducing.

31. In a dictating machine of the type adapted to utilize records in sheet form having abutment means therein by which the record is engaged and driven and wherein the records are wrapped upon a record-supporting surface having record-engaging means with said record-engaging means engaging said abutment-means and holding the record in position on the supporting surface for the record to be scanned by a sound transducing head during sound recording and sound reproducing, apparatus for loading a record onto the record supporting surface with the abutment means in accurate alignment with the record engaging means comprising: means defining a record supporting surface, at least two record-engaging means on said surface, a record insertion channel providing access to said supporting surface, a record-loading cradle near the inner end of said channel and near said record supporting surface, said cradle being movable from a first position spaced from said supporting surface to a second position adjacent said supporting surface for transferring a record thereto, a cradle-control for moving said cradle from its first to its second position, at least two record-actuated switch means carried by said record supporting surface, one of said switch means being near one side of said record-loading cradle in a predetermined position with respect to a first one of said record-engaging means on said surface and arranged to be actuated by a first edge portion of a record on said cradle in properly aligned position for engagement of an abutment means of said record with said first record-engaging means, another of said switch means being near the other side of said record-loading cradle in a predetermined position with respect to a second one of said record-engaging means and arranged to be actuated by a second opposed edge portion of a record on said cradle in properly aligned position for engagement of another abutment means of said record with said second record engaging means, and a control for said cradle-control responsive to simultaneous actuation of said switch means to cause movement of said cradle from its first to its second position, whereby said loading cradle engages the record with the record-engaging means on said supporting surface with the record in accurate alignment for recording or reproducing.

32. In a sound recording and reproducing machine adapted to utilize flexible sheet records which during operation are placed upon a record-supporting surface in accurate position for sound recording or reproducing scanning, apparatus to enable a record to be inserted in accurate position for scanning comprising a record-supporting surface, record-actuated switch means near said surface to control the placing of a record on said surface, and a record-guiding channel directed toward said surface and said switch means, whereby when a record is moved therein to be placed upon said surface it strikes said switch means, said channel being narrow, whereby the inserted record is accurately guided toward said surface and the record is prevented from buckling when it strikes said switch means.

33. In a sound recording and reproducing machine adapted to utilize flexible sheet records which during operation are loaded upon a record-supporting surface in accurate position for sound recording or reproducing scanning and then are unloaded from the surface following scanning, apparatus to enable a record to be loaded on said surface in accurate position for scanning and to be readily unloaded therefrom comprising: a record-supporting surface, a movable loading cradle for loading a record on said surface, driving means for operating said loading cradle, switch-actuating means near said surface and near said loading cradle, a control device responsive to actuation of said switch-actuating means to initiate operation of said driving means, a record-loading guiding channel directed toward said surface and said switch-actuating means, whereby when a record is moved therein to be loaded upon said surface it strikes and actuates said switch-actuating means, said channel being narrow whereby the record moved therein is accurately guided toward said surface and the record is prevented from buckling while it strikes and actuates said switch-actuating means to initiate operation of said driving means to load the record on said surface in accurate position for scanning, and a wide record-unloading guiding channel to readily guide a record away from said surface following scanning.

34. In a sound recording and reproducing machine of the type wherein a flexible sheet is loaded into the machine and placed upon a revolvable record-supporting surface in position for recording or reproducing scanning and removed therefrom following scanning, a loading chute assembly providing an insertion and ejection channel for a flexible sheet comprising: an upper guide plate having an inner end adjacent said record-supporting surface, a movable intermediate guide plate having an inner end adjacent said record-supporting surface which is downwardly directed, and a lower guide plate having a movable cradle extension which can be moved adjacent the record-supporting surface and which is upwardly curved so as to be concentric with the record-supporting surface when adjacent thereto, said intermediate guide plate being movable to an upper injection position wherein an insertion channel exists between the intermediate guide plate and the lower guide plate, and the downwardly directed inner end of the intermediate guide plate serves to deflect a record inserted between said intermediate and lower guide plates downwardly and along said cradle extension into accurate position for loading, said intermediate guide plate being movable to a lower position wherein an ejection channel exists between the intermediate guide plate and the upper guide plate, and the downwardly directed inner end of the intermediate guide plate abuts against said cradle extension to provide a continuous surface to guide an ejected sheet out under said upper guide plate.

35. A chute assembly as claimed in claim 34 and wherein said lower guide plate is movable to a lower position when the downwardly directed inner end of said intermediate guide plate abuts against it so as to widen the inner mouth of the ejection channel to facilitate record ejection.

36. In a phonograph apparatus adapted to utilize sheet records, a record handling mechanism comprising a rotatable record supporting mandrel, record engagement means carried by said mandrel, a record-ejecting chute assembly extending from said mandrel for receiving records ejected by reverse rotation of said mandrel, said mandrel having a predetermined correct ejecting position wherein said record engagement means is positioned correctly for initiation of ejection of the record when the mandrel is driven in reverse direction, a carriage movable along said mandrel, a carriage-operated switch arranged to be actuated by the presence of the carriage at a predetermined position along its path, an indexing switch operated in synchronized relationship with said mandrel and having overlapping forward and ejection initiation positions, a forward mandrel-driving circuit under the control of said indexing switch and said carriage-operated switch and being arranged to rotate said mandrel in its forward direction when said indexing switch is in its forward position so as to prevent initiation of ejection from an incorrect mandrel position by rotating said mandrel into its correct ejecting position, a reverse mandrel-driving circuit under the control of said indexing switch and under the control of said carriage-operated switch and arranged to initiate rotation of said mandrel in its reverse direction to eject the record into said chute, a forward circuit interruption switch to interrupt said forward circuit whenever said reverse circuit is initiating reverse rotation of the mandrel, and a reverse holding circuit to maintain reverse rotation once it has been initiated.

37. In a sound recording and reproducing machine of the type adapted to utilize a flexible sheet record and wherein during operation the record is injected in an injection position to be engaged by a revolvable record-engaging member and is wrapped around a record-supporting surface by forward revolution of said record-engaging member so as to form a closed loop for sound recording or reproducing and then is ejected from the record-supporting surface through an ejection channel by reverse revolution of the record-engaging member, apparatus to control the operation of said record-engaging member to assure that during record ejection it commences reverse revolution from a first ejection region to cause a record sheet to be ejected correctly through said channel and to assure that it does not commence reverse revolution from a second region in which the record sheet might not be correctly ejected comprising: a revolvable record-engaging member, an index control assembly coupled thereto and including a forward-stop switch and a reverse-neutral switch, said forward-stop switch being in forward condition when said record-engaging element is positioned away from the injection position and being in stop condition when said record-engaging element is adjacent the injection position, said reverse switch being in reverse condition when said record-engaging element is in the correct ejection region and being in neutral condition when said record-engaging element is not in the correct ejection region, said forward condition of the forward-stop switch at least partially overlapping said reverse condition of the reverse-neutral switch and said reverse condition of the reverse-neutral switch entirely overlapping said stop condition of the forward-stop switch, a forward control circuit connected to said forward-stop switch and arranged to cause forward revolution of said record-engaging element when the forward-stop switch is in forward condition, a reverse drive control circuit connected to said reverse switch and arranged to be in reversing condition to cause reverse revolution of said record-engaging element when the reverse-neutral switch is in reverse condition, a reverse interlock switch in said forward control circuit and coupled to said reverse drive control circuit responsive to reversing condition of said reverse drive control circuit to open the forward control circuit, and an injection switch common to both said circuits, whereby closure of said ejection switch when said reverse switch is in reverse condition immediately initiates reverse revolution of said record engaging element, but if said reverse switch is in neutral condition causes forward revolution of the record-engaging member until said reverse switch reaches its reverse condition, at which time the reverse interlock switch opens the forward circuit, and the reverse switch initiates reverse revolution of the record-engaging element.

38. Apparatus as claimed in claim 37 and including a time-delay circuit-interrupting switch in said reverse control circuit arranged to interrupt said reverse circuit to stop its reversing condition, thereby allowing said interlock switch again to close the forward control circuit to cause forward revolution of said record-engaging member until said forward-stop switch reaches its stop condition, and braking means responsive to the stop condition of said forward-stop switch to stop said record-engaging member adjacent said injection position, whereby to be ready to engage an injected record.

39. In a dictating machine of the type adapted to utilize records in sheet form having a plurality of abutment means by which the record is engaged and driven and wherein the records are wrapped upon a revolvable record supporting surface in position for the record to be scanned by a sound transducing head during sound recording and sound reproducing, apparatus for loading a record onto the record supporting surface in accurate alignment comprising: means defining a curved record supporting surface having at least a pair of record--engaging means associated therewith and adapted to engage said abutment means, a record insertion channel providing access to said supporting surface, a record-loading cradle near the inner end of said channel and near said record supporting surface, said cradle being curved with a radius of curvature substantially equal to said record-supporting surface to conform to said record-supporting surface and being movable from a first position spaced from said record-supporting surface to a second position adjacent to and conforming to said supporting surface for transferring a record thereto, said cradle having openings therein adapted to provide clearance for said record-engaging means when said cradle is positioned adjacent to said supporting surface, and cradle-control means for moving said cradle from its first to its second position.

40. In a dictating machine of the type adapted to utilize records in sheet form and wherein the records are engaged by record-engaging means and driven along a closed path in position for the record to be scanned by a sound transducing head, apparatus for automatically loading the record and for assuring proper engagement of the record and the record-engaging means comprising: means defining a closed record path, a record insertion channel defined therein, record-engaging means adapted to engage and drive a sheet record along said closed path, a record-loading cradle near the inner end of said channel, said cradle being movable from a first position spaced from said record-engaging means to a second position in co-operative relation therewith for engaging a properly positioned record thereon with said record-engaging means, cradle-operating mechanism for moving said cradle from the first to the second position, first and second spaced switch means, said first and second switch means controlling said cradle-operating mechanism and being simultaneously actuated by a sheet record properly positioned on said cradle in the first position for actuating said cradle-operating mechanism, thereby to engage said properly positioned record with said record-engaging means, and an interlock associated with said first and second switch means and with said cradle-operating mechanism and maintaining actuation of said cradle-operating mechanism after said cradle moves away from said first position.

References Cited in the file of this patent

UNITED STATES PATENTS

| | | |
|---|---|---|
| 2,387,068 | Hegnauer | Oct. 16, 1945 |
| 2,431,360 | Philpott | Nov. 25, 1947 |
| 2,435,260 | Wise | Feb. 3, 1948 |
| 2,525,926 | Matthews | Oct. 17, 1950 |
| 2,586,161 | Hastings | June 7, 1952 |
| 2,702,710 | Conrad | Feb. 22, 1955 |

FOREIGN PATENTS

| | | |
|---|---|---|
| 970,077 | France | June 7, 1950 |

UNITED STATES PATENT OFFICE
CERTIFICATE OF CORRECTION

Patent No. 2,847,223 August 12, 1958

Douglas E. Taylor et al.

It is hereby certified that error appears in the printed specification of the above numbered patent requiring correction and that the said Letters Patent should read as corrected below.

Column 3, line 65, for "machine" read -- machines --; column 20, line 25, for "of said" read -- to said --; column 29, line 21, for "injection" read -- ejection --.

Signed and sealed this 5th day of May 1959.

(SEAL)
Attest:

KARL H. AXLINE
Attesting Officer

ROBERT C. WATSON
Commissioner of Patents